US007587575B2

(12) United States Patent
Moertl et al.

(10) Patent No.: US 7,587,575 B2
(45) Date of Patent: Sep. 8, 2009

(54) COMMUNICATING WITH A MEMORY REGISTRATION ENABLED ADAPTER USING CACHED ADDRESS TRANSLATIONS

(75) Inventors: Daniel F. Moertl, Rochester, MN (US); Renato J. Recio, Austin, TX (US); Claudia A. Salzberg, Austin, TX (US); Steven M. Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 11/550,217

(22) Filed: Oct. 17, 2006

(65) Prior Publication Data

US 2008/0091915 A1 Apr. 17, 2008

(51) Int. Cl.
*G06F 12/02* (2006.01)

(52) U.S. Cl. ............................ 711/206; 711/6; 711/202

(58) Field of Classification Search ....................... None
See application file for complete search history.

(56) References Cited

U.S. PATENT DOCUMENTS

| | | | | |
|---|---|---|---|---|
| 6,629,162 | B1 | 9/2003 | Arndt et al. | |
| 7,155,541 | B2 | 12/2006 | Ganapathy et al. | |
| 7,334,107 | B2 | 2/2008 | Schoinas et al. | |
| 7,353,360 | B1 | 4/2008 | Muller et al. | |
| 2006/0075147 | A1 | 4/2006 | Schoinas et al. | |
| 2006/0133697 | A1 | 6/2006 | Uvarov et al. | |
| 2006/0136697 | A1 * | 6/2006 | Tsao et al. | 711/206 |
| 2006/0195675 | A1 | 8/2006 | Arndt et al. | |
| 2007/0038839 | A1 | 2/2007 | Hummel et al. | |
| 2008/0065854 | A1 | 3/2008 | Schoenberg et al. | |
| 2008/0080491 | A1 | 4/2008 | Saripalli | |

OTHER PUBLICATIONS

U.S. Appl. No. 11/550,115, filed Oct. 17, 2006, Moertl et al.
U.S. Appl. No. 11/550,162, filed Oct. 17, 2006, Moertl et al.
U.S. Appl. No. 11/550,191, filed Oct. 17, 2006, Moertl et al.
U.S. Appl. No. 11/550,193, filed Oct. 17, 2006, Moertl et al.
InfiniBand™ Host Channel Adapter Verb Implementer's Guide, Revision 1.3, Intel Corporation, Mar. 23, 2003, 67 pages.

(Continued)

*Primary Examiner*—Than Nguyen
(74) *Attorney, Agent, or Firm*—Stephen J. Walder, Jr.; Libby Z. Handelsman

(57) ABSTRACT

Mechanisms for communicating with a memory registration enabled adapter, such as an InfiniBand™ host channel adapter, are provided. With the mechanisms, device driver services may be invoked by a device driver for initializing address translation entries in an address translation data structure of a root complex. An address of a device driver data buffer data structure and registration modifiers may be passed by the device driver to the device driver services. The device driver services may create address translation data structure entries in the address translation data structure associated with the root complex and memory registration (MR) address translation entries in a MR address translation data structure of the adapter. The MR address translation data structure may then be used with I/O operations to bypass the address translation data structure associated with the root complex.

19 Claims, 17 Drawing Sheets

OTHER PUBLICATIONS

"Address Translation Services", PCI-SIG, Mar. 2006, pp. 1-35.

Abramson, Darren et al., "Intel Virtualization Technology for Directed I/O", Intel Technology Journal, vol. 10, Issue 3, 2006, pp. 179-192.

Krause, Michael et al., "I/O Virtualization and Sharing", PCI-SIG, 2006, pp. 1-56.

* cited by examiner

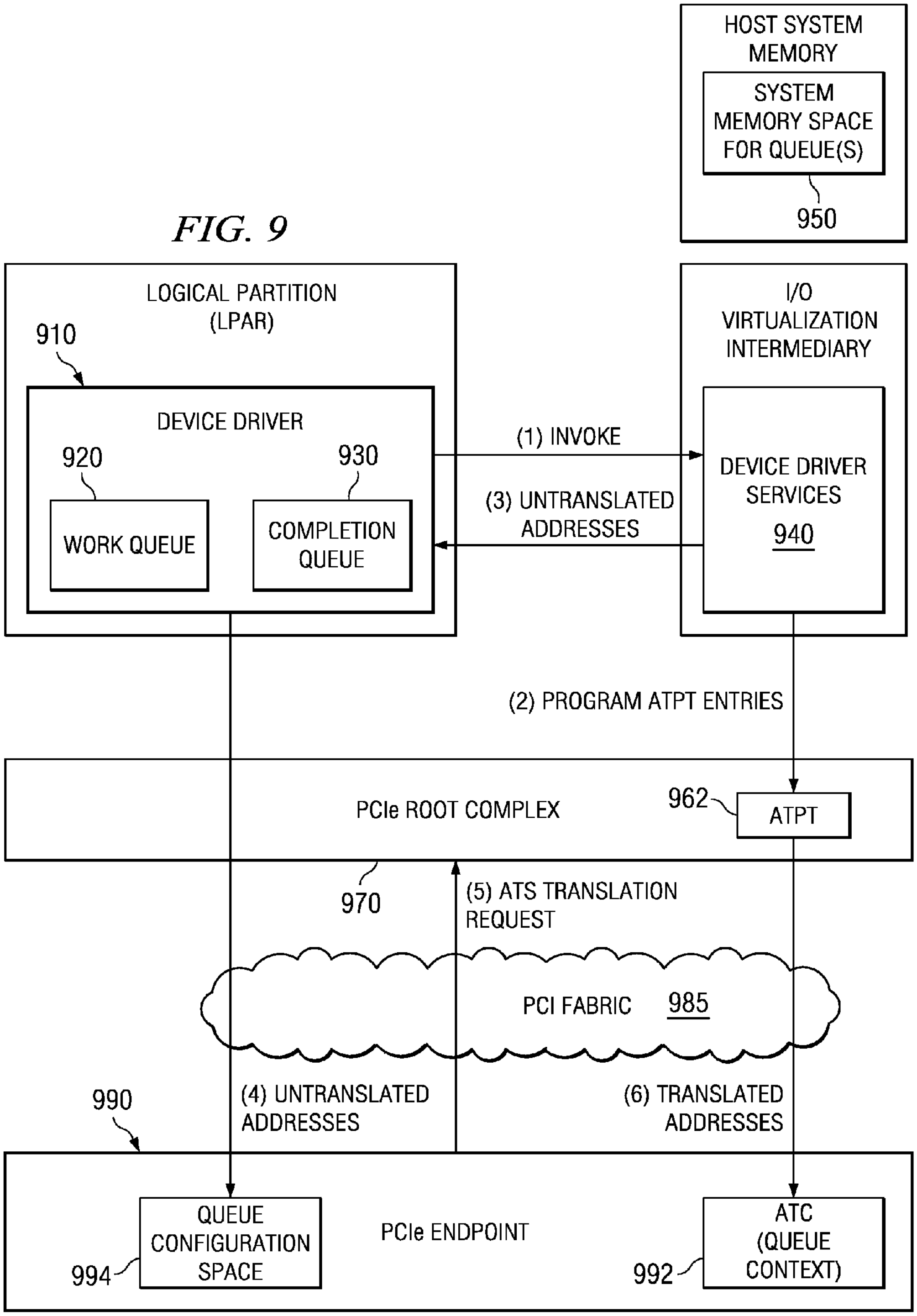
HOST SYSTEM MEMORY
SYSTEM MEMORY SPACE FOR QUEUE(S)
950
FIG. 9
LOGICAL PARTITION (LPAR)
910
DEVICE DRIVER
920
930
WORK QUEUE
COMPLETION QUEUE
(1) INVOKE
(3) UNTRANSLATED ADDRESSES
I/O VIRTUALIZATION INTERMEDIARY
DEVICE DRIVER SERVICES
940
(2) PROGRAM ATPT ENTRIES
PCIe ROOT COMPLEX
962
ATPT
970
(5) ATS TRANSLATION REQUEST
PCI FABRIC
985
990
(4) UNTRANSLATED ADDRESSES
(6) TRANSLATED ADDRESSES
QUEUE CONFIGURATION SPACE
994
PCIe ENDPOINT
ATC (QUEUE CONTEXT)
992

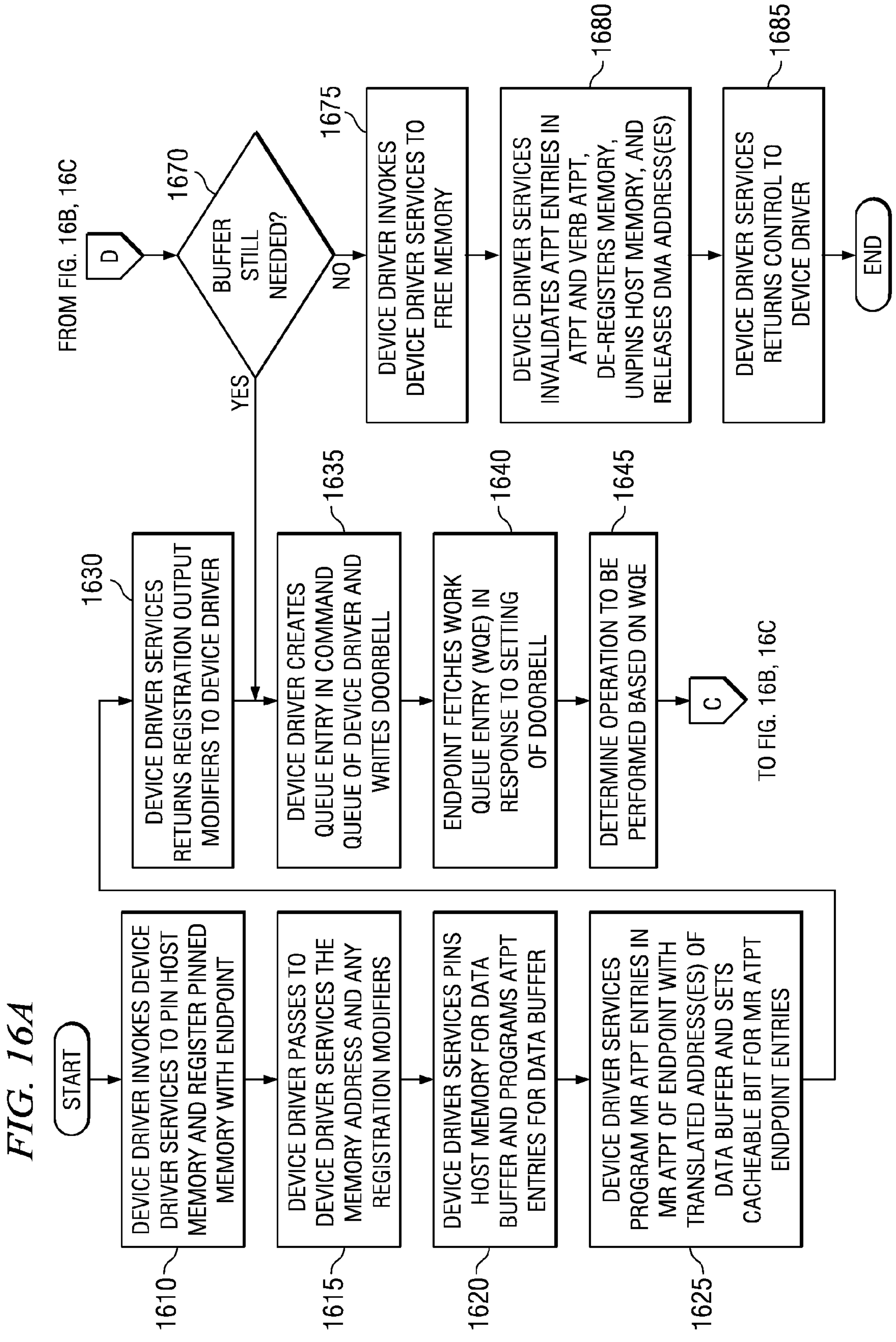
FIG. 16A
START
1610
DEVICE DRIVER INVOKES DEVICE DRIVER SERVICES TO PIN HOST MEMORY AND REGISTER PINNED MEMORY WITH ENDPOINT
1615
DEVICE DRIVER PASSES TO DEVICE DRIVER SERVICES THE MEMORY ADDRESS AND ANY REGISTRATION MODIFIERS
1620
DEVICE DRIVER SERVICES PINS HOST MEMORY FOR DATA BUFFER AND PROGRAMS ATPT ENTRIES FOR DATA BUFFER
1625
DEVICE DRIVER SERVICES PROGRAM MR ATPT ENTRIES IN MR ATPT OF ENDPOINT WITH TRANSLATED ADDRESS(ES) OF DATA BUFFER AND SETS CACHEABLE BIT FOR MR ATPT ENDPOINT ENTRIES
1630
DEVICE DRIVER SERVICES RETURNS REGISTRATION OUTPUT MODIFIERS TO DEVICE DRIVER
1635
DEVICE DRIVER CREATES QUEUE ENTRY IN COMMAND QUEUE OF DEVICE DRIVER AND WRITES DOORBELL
1640
ENDPOINT FETCHES WORK QUEUE ENTRY (WQE) IN RESPONSE TO SETTING OF DOORBELL
1645
DETERMINE OPERATION TO BE PERFORMED BASED ON WQE
C
TO FIG. 16B, 16C
FROM FIG. 16B, 16C
D
1670
BUFFER STILL NEEDED?
YES
NO
1675
DEVICE DRIVER INVOKES DEVICE DRIVER SERVICES TO FREE MEMORY
1680
DEVICE DRIVER SERVICES INVALIDATES ATPT ENTRIES IN ATPT AND VERB ATPT, DE-REGISTERS MEMORY, UNPINS HOST MEMORY, AND RELEASES DMA ADDRESS(ES)
1685
DEVICE DRIVER SERVICES RETURNS CONTROL TO DEVICE DRIVER
END

COMMUNICATING WITH A MEMORY REGISTRATION ENABLED ADAPTER USING CACHED ADDRESS TRANSLATIONS

BACKGROUND

1. Technical Field

The present application relates generally to an improved data processing system and method. More specifically, the present application is directed to an apparatus and method for communicating with a memory registration enabled adapter using cached address translations.

2. Description of Related Art

On some systems, with current Peripheral Component Interconnect (PCI) protocols, when performing direct memory access (DMA) operations, address translation and access checks are performed using an address translation and protection table (ATPT). Though ATPTs have been in use for several decades, they are new to lower end systems and are known by several other names, such as a Direct Memory Access (DMA) Remapping Resource or an Input/Output Memory Management Unit (IOMMU). The ATPT stores entries for translating PCI bus addresses, utilized in DMA transactions, to real memory addresses used to access the real memory resources. The entries in the ATPT store protection information identifying which devices may access corresponding portions of memory and the particular operations that such devices may perform on these portions of memory.

Recently, the PCI-SIG has been in the process of standardizing mechanisms that allow the address translations resident in an ATPT to be cached in a PCI family adapter. These mechanisms are known as Address Translation Services (ATS). ATS allows a PCI family adapter to request a translation for an untranslated PCI Bus address, where a successful completion of such a request on a system that supports ATS returns the translated, i.e. real memory address, to the PCI family adapter. ATS allows a PCI family adapter to then mark PCI bus addresses used in DMA operations as translated. A system that supports ATS will then use the translated addresses to bypass the ATPT. ATS also provides a mechanism by which the host side (e.g. hardware or virtualization intermediary) can invalidate a previously advertised address translation.

FIG. 1 is an exemplary diagram illustrating a conventional mechanism for performing DMA operations using an ATPT and the PCI express (PCIe) communication protocol. The depicted example also shows the PCIe address translation service (ATS) described above, which is invoked by PCIe endpoints, e.g., PCIe input/output (I/O) adapters that use ATS to perform address translation operations. ATS functionality is built into the PCIe endpoints and the root complex of the host system, as discussed hereafter. For more information regarding PCIe ATS, reference is made to the PCIe ATS specification available from the peripheral component interconnect special interest group (PCI-SiG) website.

As shown in FIG. 1, the host CPUs and memory 110 are coupled by way of a system bus 115 to a PCIe root complex 120 that contains the address translation and protection tables (ATPT) 130. The PCIe root complex 120 is in turn coupled to one or more PCIe endpoints 140 (the term "endpoint" is used in the PCIe specification to refer to PCIe enabled I/O adapters) via PCIe link 135. The root complex 120 denotes the root of an I/O hierarchy that connects the CPU/memory to the PCIe endpoints 140. The root complex 120 includes a host bridge, zero or more root complex integrated endpoints, zero or more root complex event collectors, and one or more root ports. Each root port supports a separate I/O hierarchy. The I/O hierarchies may be comprised of a root complex 120, zero or more interconnect switches and/or bridges (which comprise a switch or PCI fabric), and one or more endpoints, such as endpoint 140. For example, PCIe switches may be used to increase the number of PCIe endpoints, such as endpoint 140 attached to the root complex 120. For more information regarding PCI and PCIe, reference is made to the PCI and PCIe specifications available from the PCI-SiG website.

The PCIe endpoint includes internal routing circuitry 142, configuration management logic 144, one or more physical functions (PFs) 146 and zero or more virtual functions (VFs) 148-152, where each VF is associated with a PF. ATS permits each virtual function to make use of an address translation cache (ATC) 160-164 for caching PCI memory addresses that have already been translated and can be used by the virtual function to bypass the host ATPT 130 when performing DMA operations.

In operation, the PCIe endpoint 140 may invoke PCIe ATS transactions to request a translation of a given PCI bus address into a system bus address and indicate that a subsequent transaction, e.g., a DMA operation, has been translated and can bypass the ATPT. The root complex 120 may invoke PCIe ATS transactions to invalidate a translation that was provided to the PCIe endpoint 140 so that the translation is no longer used by the physical and/or virtual function(s) of the PCIe endpoint 140.

For example, when a DMA operation is to be performed, the address of the DMA operation may be looked-up in the ATC 160-164 of the particular virtual function 148-152 handling the DMA operation. If an address translation is not present in the ATC 160-164, then a translation request may be made by the PCIe endpoint 140 to the root complex 120. The root complex 120 may then perform address translation using the ATPT 130 and return the translated address to the PCIe endpoint 140. The PCIe endpoint 140 may then store the translation in an appropriate ATC 160-164 corresponding to the physical and/or virtual function that is handling the DMA operation. The DMA operation may be passed onto the system bus 115 using the translated address.

If a translation for this address is already present in the ATC 160-164, then the translated address is used with the DMA operation. A bit may be set in the DMA header to indicate that the address is already translated and that the ATPT 130 in the root complex 120 may be bypassed for this DMA. As a result, the DMA operation is performed directly between the PCIe endpoint 140 and the host CPUs and memory 110 via the PCIe link 135 and system bus 115. Access checks may still be performed by the root complex 120 to ensure that the particular BDF number of the virtual function of the PCIe endpoint corresponds to a BDF that is permitted to access the address in the manner requested by the DMA operation.

At some time later, if the translation that was provided to the PCIe endpoint 140 is no longer to be used by the PCIe endpoint 140, such as when a translation has changed within the ATPT 130, the root complex 120 must issue an ATS invalidation request to the PCIe endpoint 140. The PCIe endpoint 140 does not immediately flush all pending requests directed to the invalid address. Rather, the PCIe endpoint 140 waits for all outstanding read requests that reference the invalid translated address to retire and releases the translation in the ATC 160-164, such as by setting a bit to mark the entry in the ATC 160-164 to be invalid. The PCIe endpoint 140 returns an ATS invalidation completion message to the root complex 120 indicating completion of the invalidating of the translation in the ATC 160-164. The PCIe endpoint 140 ensures that the invalidation completion indication arrives at the root complex 120 after any previously posted writes that use the invalidated address.

Typically, the ATPT 130 may be provided as tree-structured translation tables in system memory. A different tree-structure may be provided for each PCI Bus/Device/Function (BDF) of the computing system. Using these ATPT data structures, devices may share a device address space and devices may have dedicated address spaces. Thus, not all devices may perform all DMA operations on all address spaces of the system memory.

The accessing of the ATPT 130 is done synchronously as part of the DMA transaction. This involves utilizing a time consuming translation mechanism for: translating the untranslated PCI bus memory addresses of the DMA transactions to translated real memory addresses used to access the host's memory; and checking the ATPT to ensure that the device submitting the DMA transaction has sufficient permissions for accessing the translated real memory addresses and has sufficient permissions to perform the desired DMA operation on the translated real memory addresses.

As part of accessing the ATPT 130, the correct ATPT tree data structure corresponding to a particular BDF must be identified and the tree data structure must be walked in order to perform the translation and access checking. The location of the ATPT tree data structure may require one or two accesses to find the address of the tree data structure associated with the BDF. Once found, it may take 3 or 4 accesses of the tree data structure to walk the tree. Thus, this translation and access checking is responsible for the large latencies associated with DMA operations. These latencies may cause serious issues with endpoints that require low communication latency.

As a way of mitigating these latencies, the ATS implemented in the PCIe endpoint 140 utilizes the ATCs 160-164 to store already performed address translations so that these translations need not be performed again. Thus, through a combination of the ATPT and the ATCs, the PCI ATS performs address translations and access checks in such a manner as to reduce the latency associated with DMA operations. While the PCI SiG has set forth a specification for the PCIe ATS, the PCI SiG has not specified how the responsibilities for performing address translation using ATS and managing ATS structures, such as the ATPT and ATCs, are to be apportioned in a system implementing the PCIe ATS.

SUMMARY

In one illustrative embodiment, a method, in a data processing system, is provided for managing address translations. The method comprises invoking, by a device driver, device driver services for initializing address translation entries in an address translation data structure of a root complex of the data processing system. The method further comprises passing, from the device driver to the device driver services, an address of a device driver memory data structure and registration modifiers. Moreover, the method comprises creating, by the device driver services, one or more address translation data structure entries in the address translation data structure associated with the root complex, the one or more address translation data structure entries specifying a translation of an untranslated address into a translated address that is used to directly access the device driver memory data structure. In addition, the method comprises creating, by the device driver services, one or more memory registration (MR) address translation and protection table (ATPT) entries, corresponding to the one or more address translation data structure entries, in a MR ATPT data structure of an adapter. The method also comprises using the MR ATPT data structure with I/O operations to bypass the address translation data structure associated with the root complex. The device driver is provided in one of a system image or an untrusted logical partition of the data processing system and the device driver services are provided in a trusted virtualization intermediary.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided. The apparatus may comprise a processor and an adapter coupled to the processor. The processor may invoke, by a device driver, device driver services for initializing address translation entries in an address translation data structure of a root complex of the data processing system and passes, from the device driver to the device driver services, an address of a device driver memory data structure and registration modifiers. The processor may further create, by the device driver services, one or more address translation data structure entries in the address translation data structure associated with the root complex, the one or more address translation data structure entries specifying a translation of an untranslated address into a translated address that is used to directly access the device driver memory data structure. Moreover, the processor may create, by the device driver services, one or more memory registration (MR) address translation and protection table (ATPT) entries, corresponding to the one or more address translation data structure entries, in a MR ATPT data structure of the adapter. The adapter may use the MR ATPT data structure with I/O operations to bypass the address translation data structure associated with the root complex. The device driver is provided in one of a system image or an untrusted logical partition of the data processing system and the device driver services are provided in a trusted virtualization intermediary.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 9 illustrates an implementation of the illustrative embodiments for caching address translations for PCIe endpoint queues;

FIGS. 16A-16C depict a flowchart outlining an exemplary operation for registering memory with a PCIe endpoint in accordance with one illustrative embodiment.

DETAILED DESCRIPTION OF THE ILLUSTRATIVE EMBODIMENTS

The illustrative embodiments provide mechanisms by which communication with a memory registration enabled adapter or endpoint is facilitated by using cached address translation information. Such caching of address translation information in the adapter or endpoint facilitates Direct Memory Access (DMA) transactions directly between the adapter or endpoint and the device driver.

Figure 1:
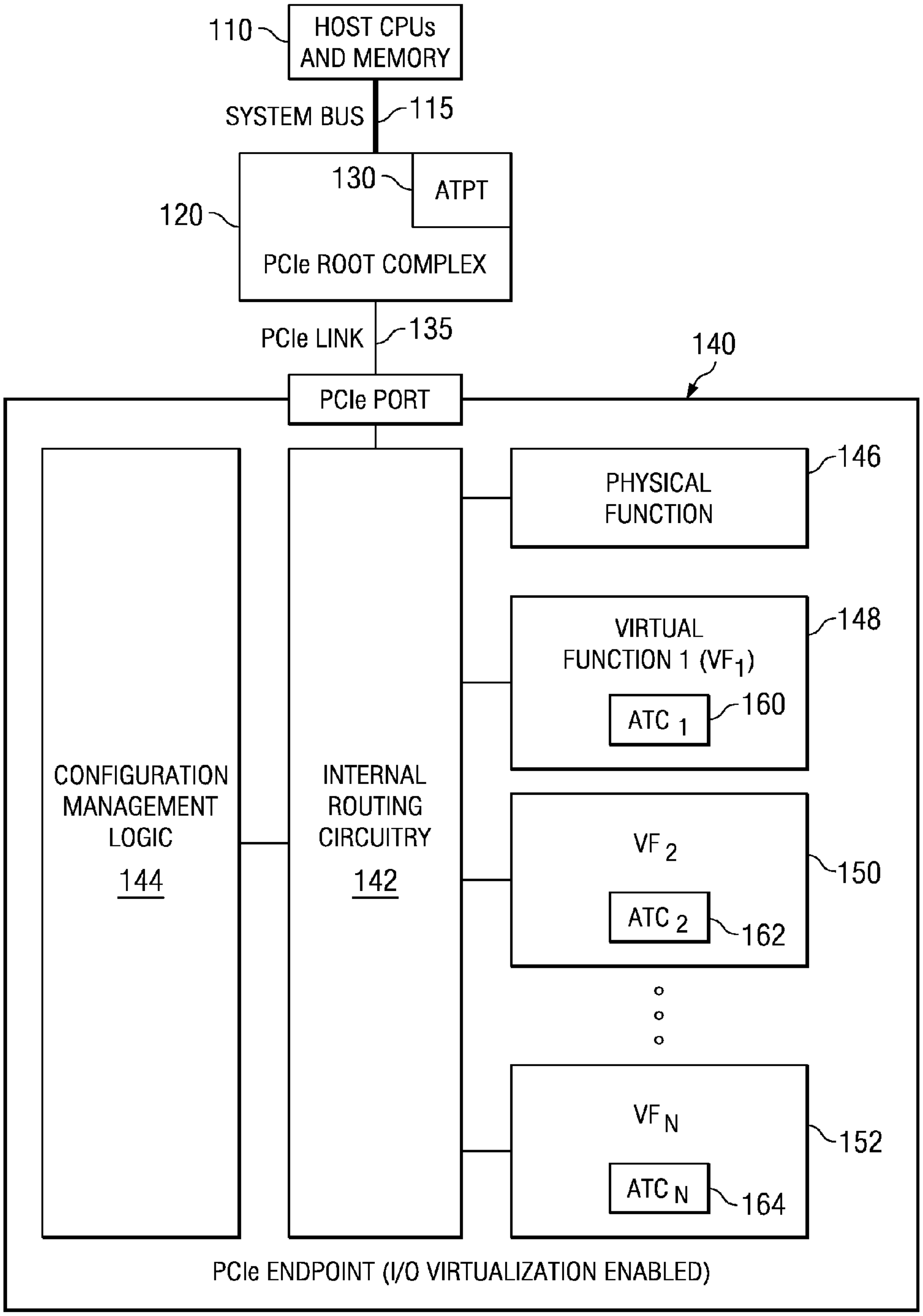
FIG. 1 is an exemplary diagram illustrating a conventional mechanism for performing DMA operations using an ATPT and the PCI express (PCIe) communication protocol.
Figure 2:
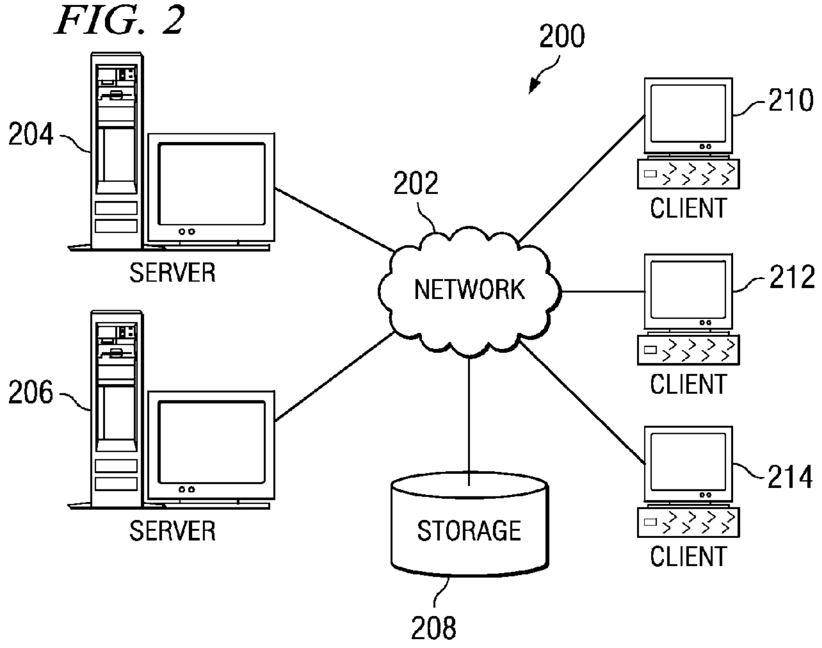
FIG. 2 is an exemplary diagram illustrating a distributed data processing environment in which exemplary aspects of the illustrative embodiments may be implemented.
Figure 3:
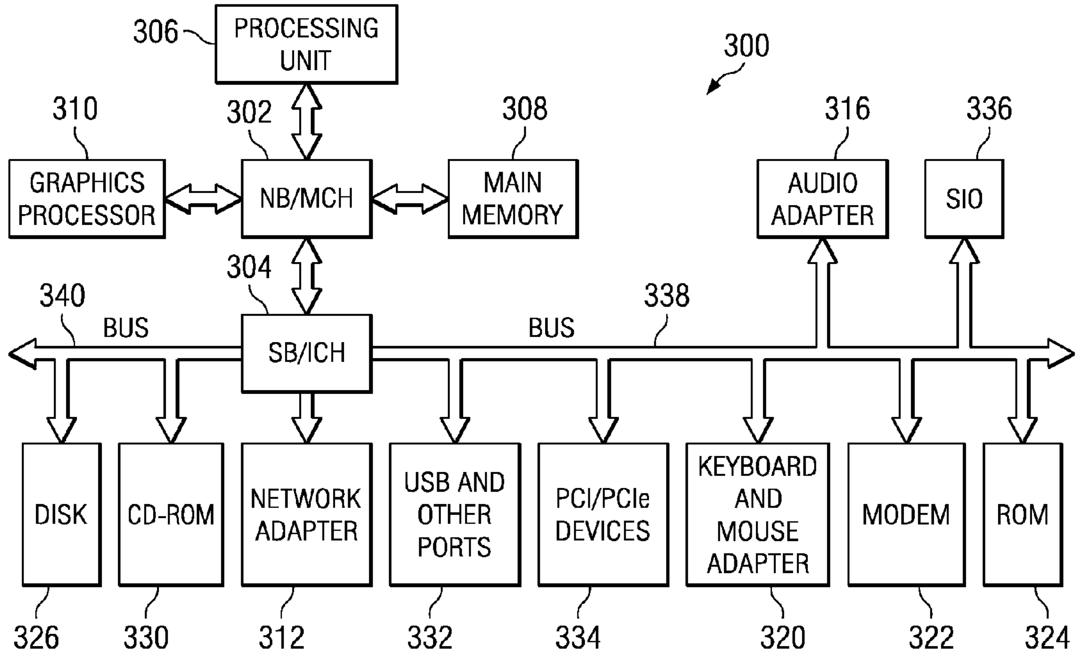
FIG. 3 is an exemplary diagram illustrating a data processing device in which exemplary aspects of the illustrative embodiments may be implemented.

As such, the illustrative embodiments may be implemented in any computing device in which DMA operations may be performed utilizing a device driver and device driver services, as described hereafter. Such computing devices may take many forms and may have various configurations. FIGS. 2-3 hereafter provide examples of a data processing environment and a data processing device in which exemplary aspects of the illustrative embodiments may be implemented. It should be appreciated that FIGS. 2-3 are only exemplary and are not intended to be limiting with regard to the types of data processing environments and devices in which the mechanisms of the illustrative embodiments may be utilized.

With reference now to the figures and in particular with reference to FIGS. 2-3, exemplary diagrams of data processing environments are provided in which embodiments of the present invention may be implemented. It should be appreciated that FIGS. 2-3 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 2 depicts a pictorial representation of an exemplary distributed data processing system in which aspects of the illustrative embodiments may be implemented. Distributed data processing system 200 may include a network of computers in which embodiments of the illustrative embodiments may be implemented. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted example, server 204 and server 206 are connected to network 202 along with storage unit 208. In addition, clients 210, 212, and 214 are also connected to network 202. These clients 210, 212, and 214 may be, for example, personal computers, network computers, or the like. In the depicted example, server 204 provides data, such as boot files, operating system images, and applications to the clients 210, 212, and 214. Clients 210, 212, and 214 are clients to server 204 in the depicted example. Distributed data processing system 200 may include additional servers, clients, and other devices not shown.

In the depicted example, distributed data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 200 may also be implemented to include a number of different types of networks, such as for example, an intranet, a local area network (LAN), a wide area network (WAN), or the like. As stated above, FIG. 2 is intended as an example, not as an architectural limitation for different embodiments of the present invention, and therefore, the particular elements shown in FIG. 2 should not be considered limiting with regard to the environments in which the illustrative embodiments of the present invention may be implemented.

With reference now to FIG. 3, a block diagram of an exemplary data processing system is shown in which aspects of the illustrative embodiments may be implemented. Data processing system 300 is an example of a computer, such as hosts 210 in FIG. 2, in which computer usable code or instructions implementing the processes for illustrative embodiments of the present invention may be located.

In the depicted example, data processing system 200 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 220, modem 322, read only memory (ROM) 324, hard disk drive (HDD) 326, CD-ROM drive 330, universal serial bus (USB) ports and other communication ports 232, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash binary input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 204.

An operating system runs on processing unit 306. The operating system coordinates and provides control of various components within the data processing system 300 in FIG. 3. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 300 (Java is a trademark of Sun Microsystems, Inc. in the United States, other countries, or both).

As a server, data processing system 300 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

Those of ordinary skill in the art will appreciate that the hardware in FIGS. 2-3 may vary depending on the implementation. Other internal hardware or peripheral devices, such as flash memory, equivalent non-volatile memory, or optical disk drives and the like, may be used in addition to or in place of the hardware depicted in FIGS. 2-3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device which is configured with flash memory to provide non-volatile memory for storing operating system files and/or user-generated data, for example. Essentially, data processing system 300 may be any known or later developed data processing system without architectural limitation.

As mentioned above, the illustrative embodiments provide a system and method for distributing the responsibilities for endpoint address translation cache management between a device driver and device driver services. The device driver may be provided, for example, in an untrusted mission logical partition (LPAR) and the device driver services may be provided, for example, in a trusted input/output (I/O) virtualization intermediary (VI). While PCIe endpoints and the PCIe communication protocol will be used in the description of the illustrative embodiments, it should be appreciated that the illustrative embodiments are not limited to such and any communication protocol may be utilized without departing from the spirit and scope of the present invention.

With regard to the illustrative embodiments, the device driver is responsible for managing and utilizing queue structures for communicating between user applications/libraries and PCIe endpoints. The device driver is further responsible for invoking memory management services provided by the device driver services. The device driver services initialize and manage the address translation and protection table (ATPT) of the PCIe root complex of the computing system as well as address translation caches (ATCs) of the PCIe endpoints. The manner by which such initialization and management is performed will be described hereafter.

In one illustrative embodiment, during initialization of a device driver for a PCIe endpoint in a system image of a logical partition of the host system, the device driver for the PCIe endpoint invokes device driver services to initialize address translation and protection table (ATPT) entries and return a PCI memory address to the device driver. In one illustrative embodiment, these ATPT entries and PCI memory addresses are associated with one or more queues of the device driver, referred to as the "device driver's queues," for communicating with the PCIe adapter.

Essentially, the device driver services pin the host system memory for the one or more queues, assign DMA addresses to the one or more queues, program the ATPT entries and enable a bit stating that the ATPT entries are cacheable, i.e. cacheable in an address translation cache on the PCIe endpoint. The device driver services then return one or more untranslated PCIe memory addresses to the device driver for the ATPT entries that may be utilized, for example, as the addresses associated with the one or more queues (e.g., a starting address and, optionally, an ending queue address of a queue). An untranslated PCIe memory address is an address that is not in the system's real memory address space and must be translated before it can be used to access the system's real memory.

Using the mechanisms of the illustrative embodiments, the untranslated PCIe memory address(es) may be provided to the PCIe endpoint and used by the PCIe endpoint to perform a translation request operation with the root complex. That is, the PCIe endpoint may request that the root complex return a translated PCIe memory address or addresses corresponding to the untranslated PCIe memory address. The PCIe endpoint may then store the translated PCIe memory address or addresses in the context associated with the device driver's queue, e.g., in an address translation cache (ATC) of a virtual function in the PCIe endpoint.

Storing the translation of the untranslated PCIe memory address in the adapter's device driver queue context allows the PCIe endpoint to bypass the root complex's ATPT on DMAs that target device driver queue entries. Thus, when the root complex receives a PCIe DMA transaction marked as translated, the root complex verifies that translation caching is enabled for the endpoint and uses the translated PCIe memory address directly to access the host's real memory.

At some point in time later, such as after the PCIe endpoint is removed from the system, after the function (physical or virtual) associated with the device driver is removed from the system, or the like, the ATPT entries and ATC entries corresponding to the untranslated PCIe memory address may need to be invalidated. In order to perform such invalidation, the device driver or some higher level entity, such as a hypervisor management component, invokes the device driver services to unpin the host memory and release the DMA address, i.e. the untranslated PCIe memory address. The device services then clear the ATPT entries corresponding to the untranslated PCIe memory address and the root complex issues an ATC entry invalidation request to the PCIe endpoint.

The PCIe endpoint then performs operations to invalidate any ATC entries corresponding to the untranslated PCIe memory address and, after the untranslated PCIe memory addresses are no longer in use, returns an ATC invalidation completion response to the device services. The device driver services then return control to the device driver. An alternate implementation consists of having the device driver services issue the ATC entry invalidation request to the PCIe endpoint and, after the PCIe endpoint completes the ATC entry invalidation, driver services clear the ATPT entries and returns to the device driver.

Figure 4:
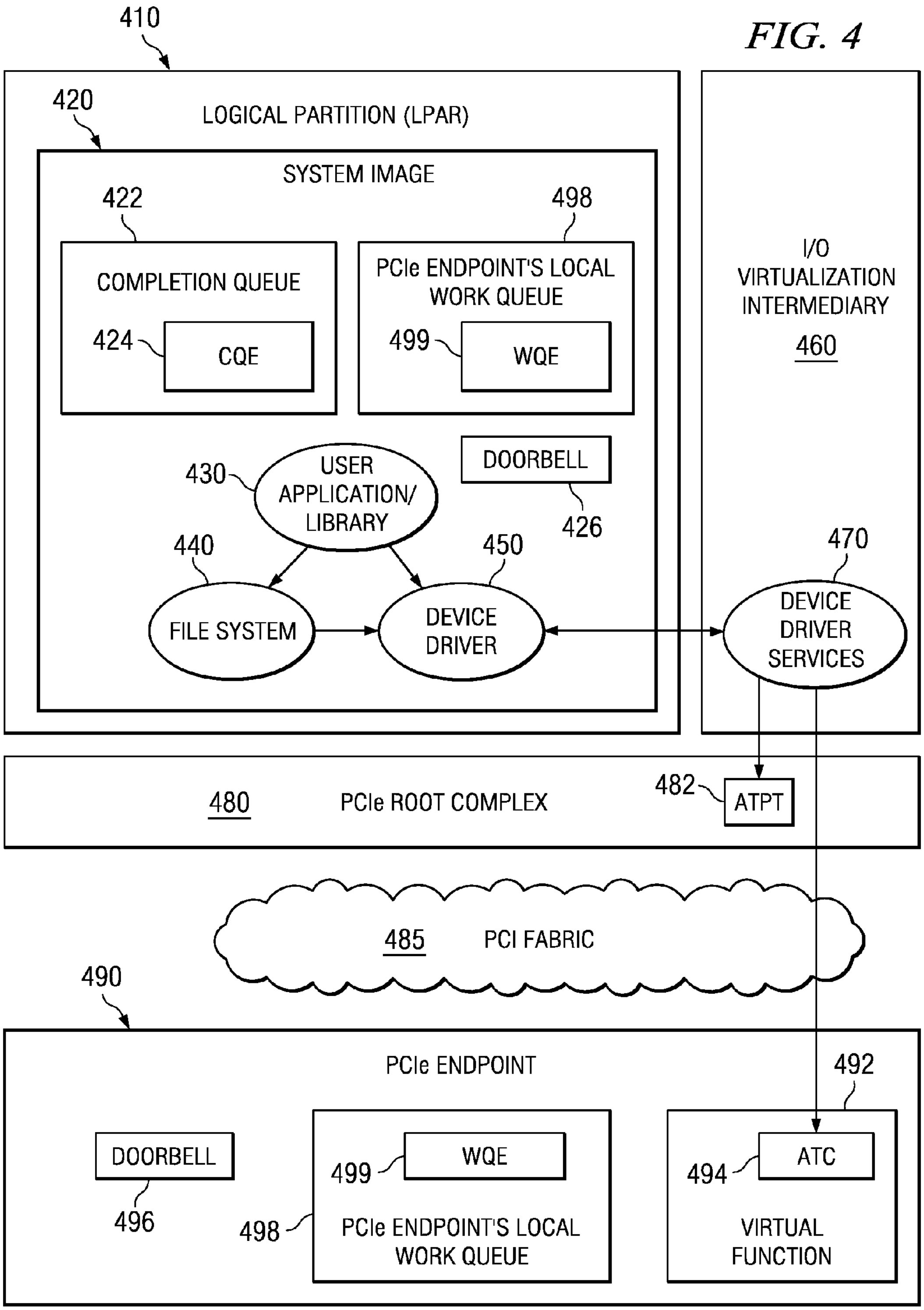
FIG. 4 is an exemplary diagram illustrating the operation of one illustrative embodiment with regard to a device driver and device driver services.

FIG. 4 is an exemplary diagram illustrating the operation of one illustrative embodiment with regard to a device driver and device driver services. As shown in FIG. 4, a host system may have one or more logical partitions 410 in which a system image 420, e.g., an operating system or the like, may execute. The system image 420 may be utilized to execute user applications 430 with access to application libraries and the like. The system image 420 has an associated file system 440 through which files, device drivers, libraries, and other software resources may be accessed. A device driver 450 may be provided in the system image 420 for communicating between the system image 420 and the PCIe adapter 490.

The device driver 450 further has an associated completion queue 422 through which the user application 430, system image 420, and the like, may communicate with a PCIe endpoint 490. The completion queue 422 has completion queue entries (CQEs) 424 for completion operations associated with work queue entries that were posted by the device driver 450, user application 430, system image 420, host system memory, and other host system resources and have been completed by the PCIe endpoint 490. A doorbell storage device 426 or event mechanism is provided in association with the completion queue 422 and system image 420 for informing the system image 420 when the completion queue 422 has a completion queue entry 424 that needs to be processed. Examples of work that may be performed by such a queue include completion processing associated with work the system image 420 requested from the PCIe endpoint 490, asynchronous event processing associated with errors or events surfaced by the PCIe endpoint 490 to system image 420, and the like.

Similarly, the PCIe endpoint 490 may have an associated PCIe endpoint work queue 498 in which work queue entries (WQEs) 499 may be provided for informing the PCIe endpoint 490 of operations the system image 420, user applications 430, or the like, wants to be performed by the PCIe endpoint 490. The PCIe endpoint 490 work queue 498 may be implemented in the PCIe endpoint 490 itself or, more commonly, in a system image 420 memory location that is accessible by the PCIe endpoint 490, as depicted. A doorbell storage device 496 may be provided in the PCIe endpoint 490 for informing the PCIe endpoint 490 of when a WQE 499 is present in the PCIe endpoint work queue 498 for processing. The work queues can be: send work queues used for outbound work only; receive work queues used for inbound work only; shared receive work queues used for sharing receive work queue entries among multiple receives queues; or a mixed send and receive work queues, where both outbound and inbound work can be posted on the same queue.

The PCIe endpoint 490 further has one or more physical functions (not shown) and virtual functions 492. The virtual functions 492 may further maintain an address translation cache (ATC) 494 for caching translated addresses for use in performing direct memory access (DMA) operations with host system memory, for example. The ATCs 494 may be stored in a device driver's queue context at the PCIe endpoint 490. Each virtual function may have one or more work queues, completion queues and event queues.

The PCIe endpoint 490 is coupled to the host system via a PCI fabric 485, which may be comprised of communication links, one or more PCI switches, and the like. The host system has a PCIe root complex 480 for communicating with the PCIe endpoint 490 via the PCI fabric 485. The root complex 480 maintains an address translation and protection table (ATPT) 482 which is used to translate untranslated PCIe memory addresses into translated addresses used in the system's real memory address space.

Management of the ATPT 482 and the ATC 494 is performed by device driver services 470 provided in an input/output (I/O) virtualization intermediary (VI) 460. The IOVI 460 may be, for example, a hypervisor or other virtualization management component, such as a trusted service partition. The device driver services 470 may be invoked by the device driver 450 when needed to initialize and invalidate entries in the ATPT 482 and the ATC 494.

The responsibilities for managing communications between the host system and the PCIe endpoint are split between the device driver 450 and the device driver services 470. Specifically, the device driver 450 is responsible for managing its one or more completion queues 422 and the PCIe endpoint's one or more work queues 498. The device driver 450 is further responsible for invoking the device driver services 470 when needed to perform the necessary functions for initializing address translation entries in the ATPT 482 and for invalidating entries in the ATPT 482 and the ATC 494 when the translations are no longer to be used by the PCIe endpoint 490.

During initialization of the device driver 450, the device driver 450 may initialize a DMA address space for one or more queues, such as a device driver one or more completion queues 422, a PCIe endpoint's one or more work queues 498 that resides in system image 420 for communicating with the PCIe endpoint 490, and the like. In turn, the device driver 450 for the PCIe endpoint 490 invokes device driver services 470 to initialize ATPT 482 entries for translating PCIe addresses into DMA address space addresses for accessing portions of system memory. Each ATPT entry is for one set of contiguous PCI bus addresses. The mechanism for initialization address translation and protection table entries is generally known in the art. For example, a mechanism for initializing such entries is described in commonly assigned U.S. Pat. No. 6,629,162. The device driver services 470 then return one or more PCI memory address to the device driver 450.

Essentially, in the depicted example, the device driver services 470 pin the host system memory for the one or more completion queues 422 and the PCIe endpoint's one or more work queues 498, if it resides in system image 420. The device driver services 470 assign DMA addresses, which are untranslated PCIe memory addresses, to the device driver's one or more completion queues 422 and the PCIe endpoint's one or more work queues 498, if it resides in system image 420. The device driver services 470 program the ATPT entries and enable a bit stating that the ATPT entries for the device driver's one or more completion queues 422 and the PCIe endpoint's one or more work queues 498, if it resides in system image 420, are cacheable, i.e. cacheable in the ATC 494 on the PCIe endpoint 490. The device driver services 470 then return an untranslated PCIe memory address to the device driver 450 for the ATPT entries.

Using the mechanisms of the illustrative embodiments, the untranslated PCIe memory address(es) may then be provided to the PCIe endpoint 490 to inform the PCIe endpoint 490 of the location of queues 422 and 498. The untranslated PCIe memory address(es) may be used by the PCIe endpoint 490 to send a translation request operation to the root complex 480. That is, the PCIe endpoint 490 may request that the root complex 480 return translated PCIe memory address(es) associated with the untranslated PCIe memory address. The PCIe endpoint 490 may then store the translated PCIe memory address(es) in the context associated with the device driver's queues, e.g., ATC 494. As a result, the storing of the translation of the untranslated PCIe memory address in the PCIe endpoint's device driver queue context or ATC 494 allows the PCIe endpoint 490 to bypass the root complex's ATPT 482 on DMAs that target device driver queue entries, e.g., CQE 424 in completion queue 422. That is, when the root complex 480 receives a PCIe DMA transaction marked as translated, it will verify that translation caching is enabled for the PCIe endpoint 490 and use the translated PCIe memory address directly to access the host system's real memory.

At some point in time later, such as after the PCIe endpoint 490 is removed from the system, after the function (physical or virtual) associated with the device driver 450 is removed from the host system, or the like, the ATPT entries and ATC entries corresponding to the untranslated PCIe memory address(es) may need to be invalidated. In order to perform such invalidation, the device driver 450, hypervisor management component, or the like, invokes the device driver services 470 to unpin the host memory and release the DMA address(es), i.e. the untranslated PCIe memory address(es). The device driver services 470 then clears the ATPT entries in the ATPT 482 corresponding to the untranslated PCIe memory address(es), e.g., by setting a bit in the ATPT 482 stating that the entry is no longer valid or by "zero'ing" the ATPT entry to indicate it is no longer valid.

The root complex 480 then issues an ATC entry invalidation request to the PCIe endpoint 490. The PCIe endpoint 490 then performs operations to invalidate any ATC entries in the ATC 494 corresponding to the untranslated PCIe memory address(es). Such invalidation may involve, for example, removing the cached translation from the queue contexts, e.g., ATC 494, of any virtual functions that were caching the translation. After the untranslated PCIe memory addresses are no longer in use, i.e. when all outstanding DMA operations that reference the untranslated PCIe memory address complete, the PCIe endpoint 490 returns an ATC invalidation completion response to the device driver services 470. The device driver services 470 then return control to the device driver 450. In an alternate implementation, the device driver services 470 may issue the ATC entry invalidation request to the PCIe endpoint 490 and, after the PCIe endpoint 490 completes the ATC entry invalidation, the device driver services 470 may clear the ATPT entries in the ATPT 482 and return to the device driver 450.

Figure 5:
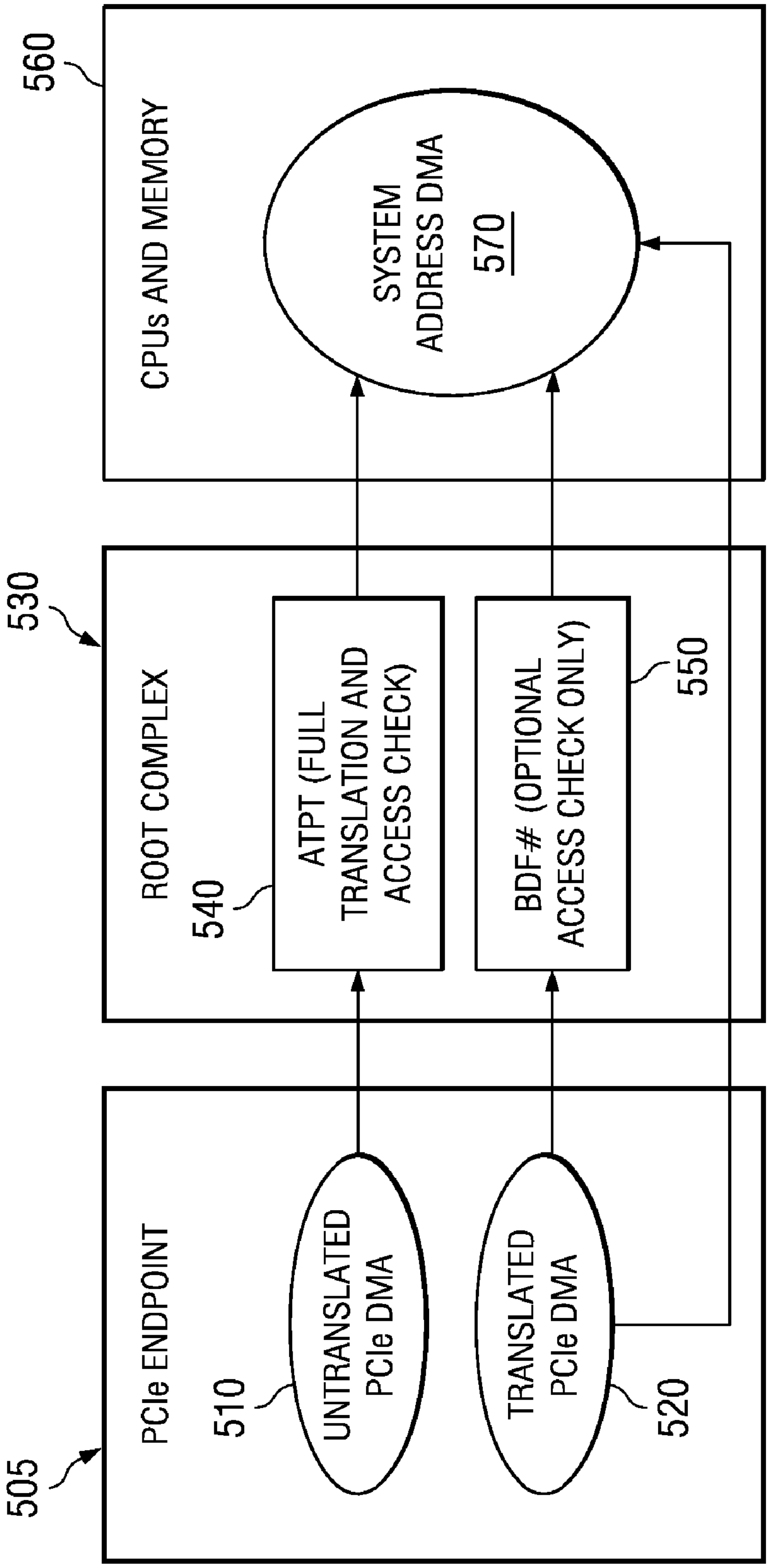
FIG. 5 is an exemplary diagram illustrating the handling of translated and untranslated PCIe addresses with DMA operations in accordance with one illustrative embodiment.

FIG. 5 is an exemplary diagram illustrating the handling of translated and untranslated PCIe addresses with DMA operations in accordance with one illustrative embodiment. The operation shown in FIG. 5 assumes that appropriate ATPT entries for the DMA operations have been initialized using the device driver and device driver services, as described previously. FIG. 5 shows one operation for a DMA using an untranslated PCIe address being sent from the PCIe endpoint 505 to the CPUs and memory 560 of the host system, and another operation for a DMA using a translated PCIe address being sent from the PCIe endpoint 505 to the CPUs and memory 560.

As shown in FIG. 5, when a DMA operation request is generated or received in a virtual function of the PCIe endpoint 505, a check of the corresponding ATC may be performed to determine if an address translation for the untranslated PCIe address is present in the ATC. If an entry for the untranslated PCIe address is not present in the ATC, the DMA operation request is forwarded to the root complex 530 as an untranslated PCIe DMA 510 that uses the untranslated PCIe address. If an entry is available in the ATC, and the entry has not been invalidated, then the translated address may be used in place of the untranslated PCIe address for the DMA. As a result, a translated PCIe DMA utilizing the translated address 520 is forwarded to the root complex 530.

For untranslated PCIe DMAs 510, since the untranslated PCIe address is not in the host system memory address space, it is necessary to first translate the untranslated PCIe address into a host system memory address. This translation is done by the root complex 530, using the ATPT. In addition, the root complex 530 further performs an access check based on the BDF number of the PCIe endpoint 505 and the entries in the ATPT. That is, the root complex 530 looks up an entry corresponding to the untranslated PCIe address in the ATPT 540, gets the translated host system memory addresses corresponding to the untranslated PCIe address, and the corresponding protection information for the translated host system memory address. The protection information may identify which BDF numbers may access the corresponding host system addresses, and the particular operations that they may perform on the portions of system memory corresponding to these host system memory addresses.

If the PCIe endpoint 505 is permitted to access the portion of system memory corresponding to the translated system memory address and is permitted to perform the requested DMA operation (e.g., read/write), then the DMA operation request is forwarded to the CPUs and memory 560 using the translated system memory address 570. If the PCIe endpoint 505 is not permitted to access the portion of system memory, an error message may be returned and the DMA operation request may not be forwarded on to the CPUs and memory 560.

The translated system memory address for the untranslated PCIe address may be returned to the PCIe endpoint 505. The PCIe endpoint 505 may then store the translation in the ATC of the virtual function that submitted the DMA operation request, as described above with regard to FIG. 4. In this way, rather than having to perform this translation subsequently, the translated system memory address may be accessed in the PCIe endpoint via the ATC, thereby saving the cycles required for the ATPT translation of untranslated PCIe addresses.

For a translated PCIe DMA 520, since the PCIe address has already been translated into a system memory address by virtue of the ATC of the virtual function in the PCIe endpoint 505, the DMA operation may pass directly through the root complex 530 to the CPUs and memory 560. For example, the translated PCIe DMA 520 has a bit set in the DMA header (e.g., set by the PCIe endpoint 505) indicating that the address specified in the header of the DMA operation request is a translated address. The root complex 530 may read this bit and determine whether the bit indicates the address in the DMA operation request to be a translated or untranslated address.

If the root complex 530 determines the address to be an untranslated address, the operation outlined above with regard to the untranslated PCIe DMA operation request 510 is performed. If the root complex 530 determines that the address is a translated address, then the root complex 530 may pass the DMA operation request 520 through to the CPUs and memory 560. Optionally, an access check based on the BDF number of the PCIe endpoint 505 may still be performed to ensure that the PCIe endpoint is permitted to access the portion of system memory corresponding to the translated system memory address. This access check may be very simple, such as a general check to determine if the BDF number is allowed to cache address translations and if so, the check is successful. If the BDF number is not permitted to cache address translations, then the access check fails.

Figure 6:
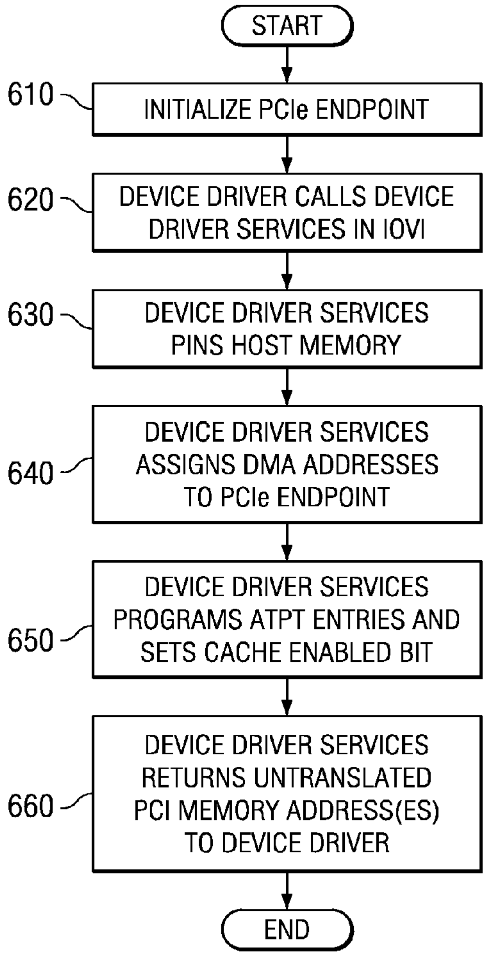
FIG. 6 is a flowchart outlining an exemplary operation for initializing ATPT entries for DMA addresses in accordance with one illustrative embodiment.
Figure 7:
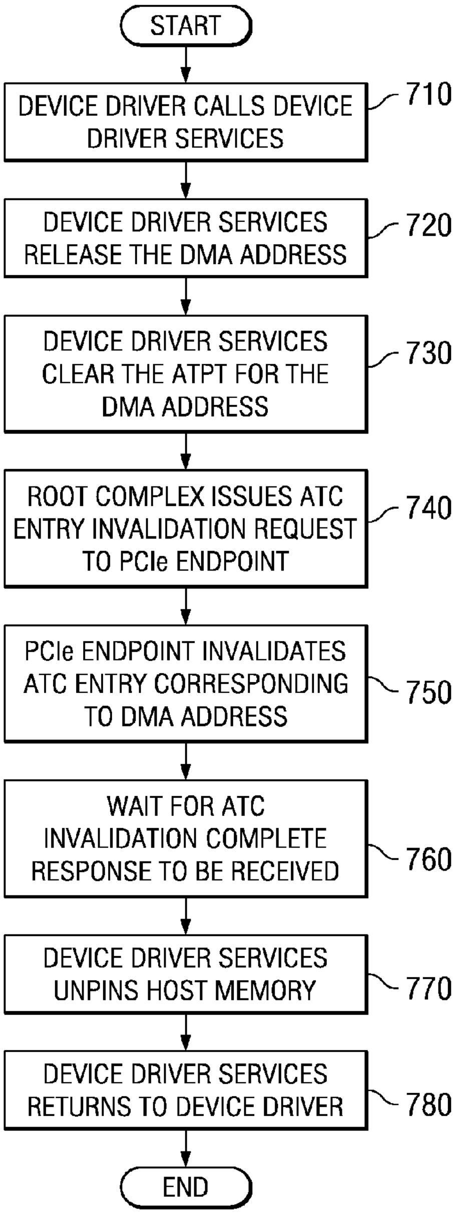
FIG. 7 is a flowchart outlining an exemplary operation for invalidating ATPT entries and ATC entries for a DMA address in accordance with one illustrative embodiment.
Figure 8:
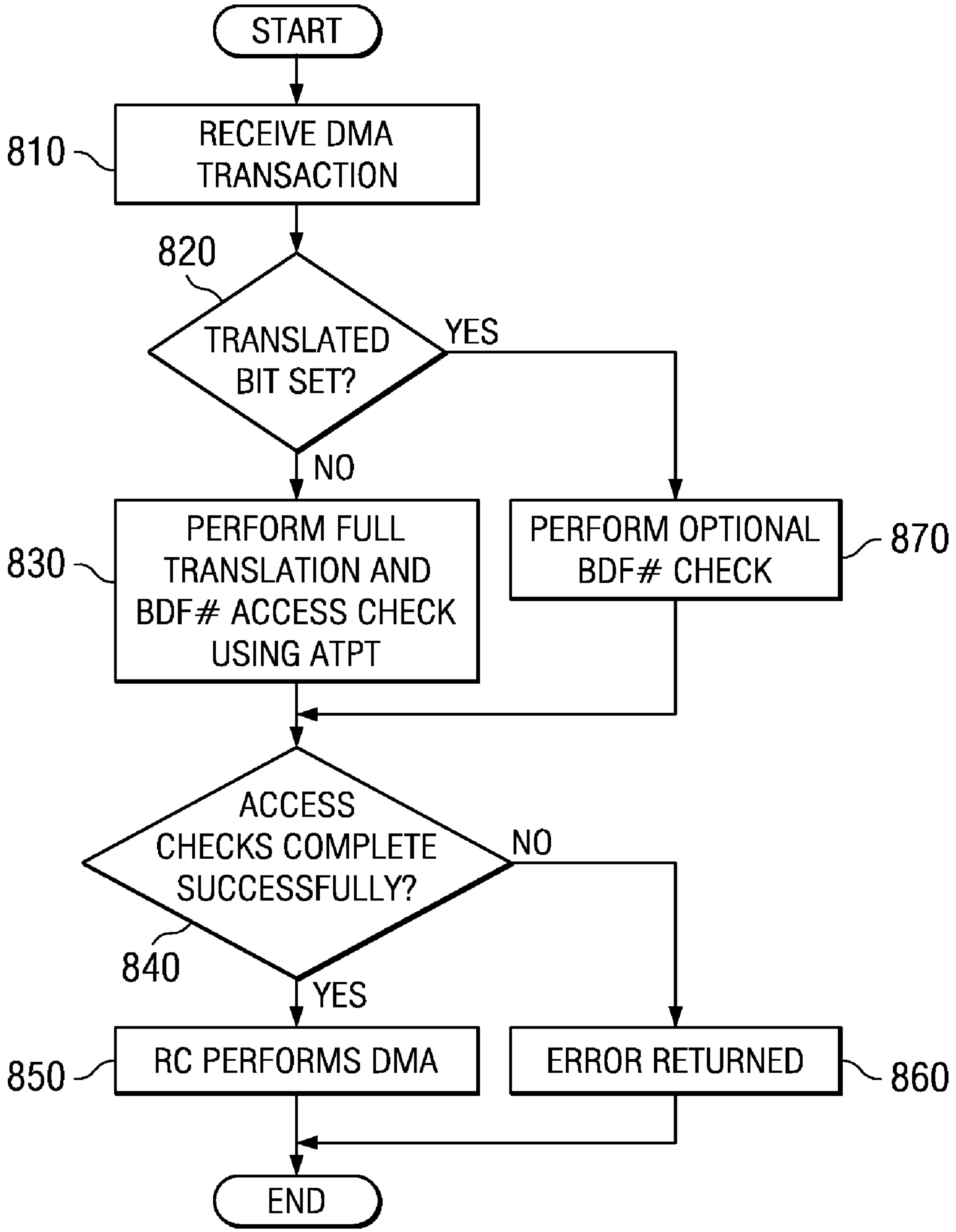
FIG. 8 is a flowchart outlining an exemplary operation for handling translated and untranslated PCIe addresses in DMA operations in accordance with one illustrative embodiment.

FIGS. 6-8 outline exemplary operations of various elements of the illustrative embodiments. It will be understood that each block of the flowchart illustrations, flowchart illustrations thereafter, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 6 is a flowchart outlining an exemplary operation for initializing ATPT entries for DMA addresses in accordance with one illustrative embodiment. As shown in FIG. 6, the operation starts with initialization, by the host system, of the device driver for the PCIe endpoint as part of the initialization of the system image on the host system (step 610). The host system calls the device driver in the logical partition which in turn calls device driver services in the I/O virtualization intermediary (step 620). The device driver services pin the host system memory (step 630).

The device driver services assign DMA addresses to the PCIe endpoint (step 640). The device driver services program the ATPT entries for the DMA addresses and set the cache enable bit, if appropriate, in the ATPT entries (step 650). The device driver services then return the untranslated PCIe memory address(es) to the device driver (step 660) and the operation terminates.

FIG. 7 is a flowchart outlining an exemplary operation for invalidating ATPT entries and ATC entries for a DMA address in accordance with one illustrative embodiment. As shown in FIG. 7, the operation starts with the device driver calling the device driver services (step 710). The device driver services releases the DMA addresses (step 720) and then clear the ATPT entries for the DMA addresses (step 730).

The root complex issues an ATC entry invalidation request to PCIe endpoint (step 740). The PCIe endpoint invalidates the ATC entry corresponding to the DMA address that is to be invalidated (step 750). The device driver services wait for an ATC invalidation completion response to be received (step 760). Once the ATC invalidation completion response is received, the device driver services may unpin the host system memory (step 770) and return control to the device driver once the ATC invalidation is completed (step 780). The operation then terminates.

FIG. 8 is a flowchart outlining an exemplary operation for handling translated and untranslated PCIe addresses in DMA operations in accordance with one illustrative embodiment. As shown in FIG. 8, the operation starts with receiving, in the root complex, a DMA transaction (step 810). The root complex determines whether the translated bit is set (step 820). If the translated bit is not set, the root complex performs a full transformation and BDF number access check using the ATPT (step 830).

Thereafter, two paths of operation are followed. In a first path, a determination is made as to whether the source of the DMA operation is permitted to perform the translated DMA operation, i.e. a determination as to whether the access checks complete successfully (step 840). If not, an error is returned (step 860). If the source is permitted to perform the translated DMA operation, then the root complex performs the DMA (step 850). The operation then terminates.

If the translated bit is set (step 820), an optional BDF number access check may be performed (step 870). The operation continues to step 840 bypassing the address translation of step 830.

Thus, the illustrative embodiments provide a mechanism by which device driver services are invoked to initialize and invalidate address translations in an address translation data structure of a root complex of a host system. These device driver services may be provided in an I/O virtualization intermediary and may be invoked by a device driver provided in a logical partition in association with a system image. The device driver services may, through the root complex, create address translation data structure entries for translating virtual addresses, e.g., untranslated PCIe addresses, into system memory addresses. Moreover, the device driver services may, through the root complex, clear address translation entries from the address translation data structure and, through the PCIe endpoint, invalidate entries in any address translation caches of the PCIe endpoint.

As mentioned above, the mechanisms of the illustrative embodiments may be utilized to establish ATPT entries for use in communicating between the system image, applications running in the system image, etc., and the PCIe endpoint using one or more queue data structures. In such an implementation of the illustrative embodiments, the ATPT entries for the one or more queue data structures are initialized in the manner previously described above. During the PCIe endpoint's initialization phase, the PCIe endpoint verifies that the device driver has been initialized. This may be done, for example, by reading information from a PCI configuration space, a Vital Product Data (VPD) field, or a memory mapped input/output (MMIO) field of the PCIe endpoint.

The device driver may provide the start and ending addresses, the starting address and a length, or the like, of the one or more queues to the PCIe endpoint. For example, the device driver may write these addresses into a PCI configuration space field, VPD or MMIO field of the PCIe endpoint corresponding to a queue configuration space. These addresses are untranslated PCIe addresses. The PCIe endpoint may invoke a PCIe ATS request for translation of the queue addresses. As a result, the root complex may use the ATPT to perform address translation and return the result to the PCIe endpoint which may cache the translated addresses in a queue context for use in retrieving items from the one or more queues and to place items in the one or more queues. By pre-translating the queue addresses in this way, the latency involved in starting an I/O operation is reduced by moving the latency of the translation operation from the start of each operation to prior to any operation starting, thus improving the overall performance of DMA operations of the endpoint.

FIG. 9 illustrates an implementation of the illustrative embodiments for caching address translations for PCIe endpoint queues. As shown in FIG. 9, the device driver 910 generates queue data structures 920-930 for communicating with a PCIe endpoint 990. In the depicted example, the queue data structures 920-930 comprise a work queue 920, which may be equivalent to the PCIe endpoint's work queue 498 in FIG. 4, for example, and a completion queue 930, which may be equivalent to the completion queue 422 in FIG. 4, for example. The work queue can be part of a work queue pair, such as a send and receive work queue pair. The work queue can also be a shared receive work queue, a standalone send work queue, a receive work queue or a mixed send and receive work queue. It should be appreciated that the number of queues that may be established by the device driver 910 are not limited to two, and a smaller or greater number of queues may be utilized without departing from the spirit and scope of the present invention.

The queue data structures 920-930 may be small component system interface (SCSI) queues for communicating with SCSI I/O devices coupled to the PCIe endpoint 990, for example. These queue data structures may be configured in any manner including linked list queues, circular buffer queues, or the like.

As part of the operation performed by the device driver 910 in generating these queue data structures 920-930, the device driver 910 invokes the device driver services 940 to program the ATPT entries for the queue data structures 920-930 and return an untranslated PCIe address for the queues to the device driver 910. As previously described above, in the illustrative embodiments, the programming of the ATPT entries may involve pinning the host memory space 950 used for the queue data structures, programming the ATPT entries in the ATPT 960 of the root complex 970 with the translation information for translating from a untranslated PCIe address to a system memory address, and setting a cache enable bit in the ATPT entries indicating that the address translations corresponding to the ATPT entries are cacheable in an ATC 992 of the PCIe endpoint 990. After performing such operations, the untranslated PCIe addresses for the ATPT entries are returned to the device driver 910. These untranslated PCIe addresses may identify, for example, the start and end addresses of the queue data structures 920-930.

The untranslated PCIe addresses are provided by the device driver 910 to the PCIe endpoint 990, such as by writing the addresses to a queue configuration space 994 in the PCIe endpoint 990. The queue configuration space 994 may be, for example, a PCI configuration space, one or more VPD fields, one or more MMIO fields, or the like. In response to receiving these untranslated PCIe addresses for the queue data structures 920-930, the PCIe endpoint 990 may issue a PCIe ATS request for the queue addresses to the root complex 970. As a result, the root complex 970 may perform address translation and access checks for the untranslated PCIe addresses of the queue data structures 920-930 and return the translated addresses to the PCIe endpoint 990. The PCIe endpoint 990 may then store these address translations in a queue context provided by the address translation cache (ATC) 992 of the PCIe endpoint 990.

As a result of the above, since the PCIe endpoint now has access to the translations for the addresses associated with the queue data structures 920-930, the PCIe endpoint may now perform DMA operations to submit or retrieve queue entries to/from the queue data structures 920-930 without having to go through the root complex 970 ATPT address translation.

Once the queue data structures 920-930 are no longer to be utilized by the PCIe endpoint 990, the ATPT and ATC entries corresponding to the addresses for these queue data structures 920-930 may be invalidated in the manner previously described above. Such invalidation may be performed, for example, when the PCIe endpoint is to be removed from the system, after the function (physical or virtual) associated with the device driver is removed from the host system, or the like. As described previously, this process of invalidation may involve the device driver 910 invoking the device driver services 940 to unpin the host system memory 950 corresponding to the queue data structures 920-930, releasing the DMA addresses for these queue data structures 920-930, clearing the ATPT entries for these DMA addresses, and issuing an ATC entry invalidation request to the PCIe endpoint 990. When the ATC entry invalidation operation is completed by the PCIe endpoint 990, the device driver services 940 returns control to the device driver 910 and at this point the PCIe endpoint 990 may be removed from the system.

Figure 10:
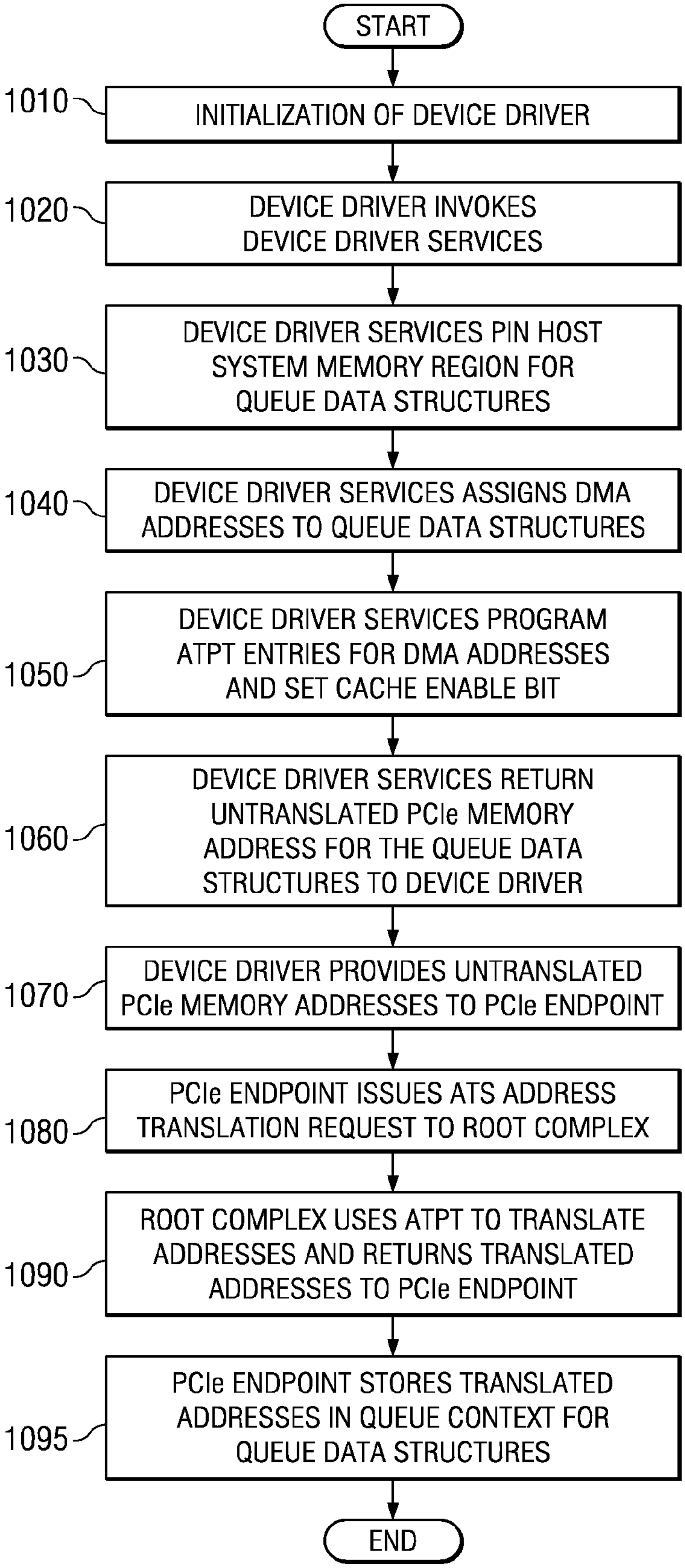
FIG. 10 is a flowchart outlining an exemplary operation for initializing a queue data structure for communication between a host system and a PCIe endpoint in accordance with one illustrative embodiment.

FIG. 10 is a flowchart outlining an exemplary operation for initializing a queue data structure for communication between a host system and a PCIe endpoint in accordance with one illustrative embodiment. Since the operation for invalidation of the addresses of a queue data structure is essentially the same as the operation outlined in FIG. 7 above, only the initialization operation for a queue data structure will be specifically illustrated by a flowchart in the present description.

As shown in FIG. 10, the operation starts with initialization, by the host system, of the device driver for the PCIe endpoint as part of the initialization of the system image on the host system (step 1010). The host system calls the device driver in the logical partition which in turn calls device driver services in the I/O virtualization intermediary (step 1020). The device driver services pin the host system memory for the queue data structure(s) (step 1030).

The device driver services assign untranslated DMA addresses, i.e. untranslated PCIe memory addresses, to the queue data structure(s) (step 1040). The device driver services program the ATPT entries for the untranslated DMA addresses and set the cache enable bit, if appropriate, in the ATPT entries (step 1050). The device driver services then return the untranslated DMA addresses, i.e. the untranslated PCIe memory addresses for the queue data structures to the device driver (step 1060).

The device driver then provides the untranslated DMA addresses for the queue data structures to the PCIe endpoint (step 1070). The PCIe endpoint issues an ATS address translation request to the root complex (step 1080). The root complex uses the ATPT to perform address translation of the untranslated DMA addresses and returns the translated addresses to the PCIe endpoint (step 1090). The PCIe endpoint stores the translated addresses in a queue context for the queue data structures (step 1095) and the operation terminates. Thereafter, the PCIe endpoint may use the translated addresses in the queue context to DMA requests to and from the queue data structures.

Thus, the illustrative embodiments provide a mechanism by which one or more queues for communicating between a system image, applications running in the system image, or the like, and a PCIe endpoint, e.g., an I/O adapter, may be created. The mechanisms of the illustrative embodiments provide for the initialization and usage of ATPT entries in a root complex for translating addresses associated with the one or more queues from an untranslated address space, e.g., PCIe bus address space, to a translated address space, e.g., system bus address space. Moreover, the illustrative embodiments provide mechanisms for storing translations in the PCIe endpoint as part of an address translation cache so that requests using untranslated addresses matching these translations may be directly forwarded to the one or more queues without having to go through formal translation in the root complex.

As described above, the mechanisms of the illustrative embodiments may be utilized to establish queue data structures in a device driver and their corresponding ATPT entries in the root complex of a data processing system. Once such queue data structures are initialized through the mechanisms described above, communication between the application instances, system image, and the like, of a logical partition of the host system and a PCIe endpoint may be performed using these queue data structures and ATPT entries.

These queue data structures and corresponding ATPT entries may be utilized with PCIe endpoints of different types. For example, the PCIe endpoint may be a networking adapter, such as an Ethernet adapter, Fibre Channel adapter, InfiniBand™ adapter, or the like, for communicating with other devices over one or more data networks. With such networking adapters, data that is being transmitted or received is placed into a buffer in the host system's device driver and fetched by either the host system's system image or the network adapter, depending upon whether the data is being received or transmitted. By pre-translating the data buffer addresses, the latency involved in starting an I/O operation is reduced by moving the latency of the translation operation from the start of each operation to prior to any operation starting, thus improving the overall performance of DMA operations of the endpoint.

Figure 11:
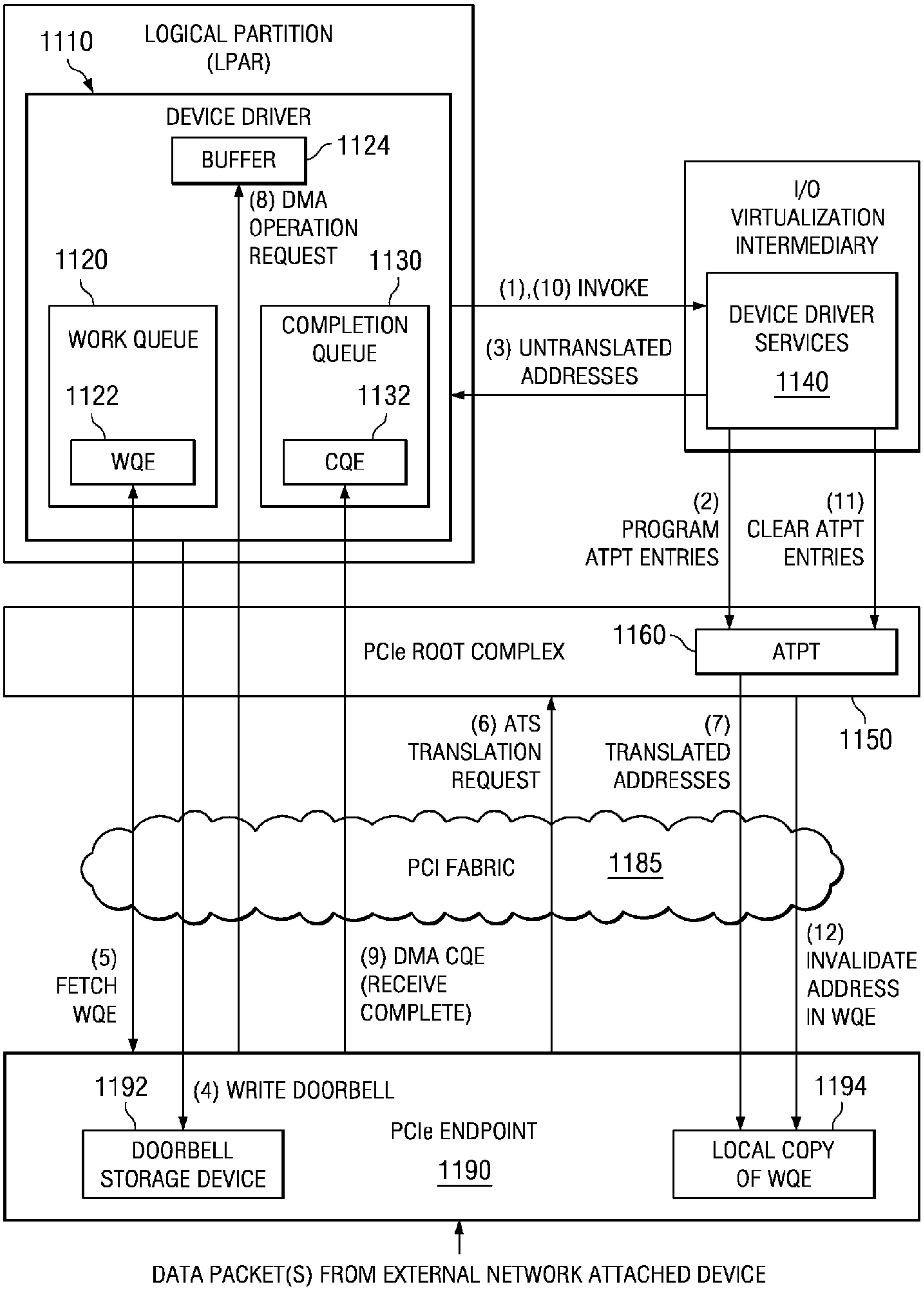
FIG. 11 is an exemplary diagram illustrating an operation for posting data in a buffer of a host system from a PCIe endpoint using a work queue entry, referred to as a "work queue entry" or WQE.

The processes for reception and transmission of data using the structures of the illustrative embodiments in association with a networking adapter will now be described with reference to FIGS. 11 and 12 hereafter. FIG. 11 is an exemplary diagram illustrating an operation for receiving data in a buffer of a host system from a PCIe endpoint using a queue entry, referred to as a "work queue entry" or WQE. Initially, the device driver 1110 invokes the device driver services 1140 to initialize one or more queue data structures, e.g., work queue data structure 1120, for sending requests to the PCIe endpoint 1190, which may be a networking adapter such as an Ethernet adapter, Fibre Channel adapter, Infiniband™ adapter, or the like. As previously described, this initialization may comprise pinning the host system memory for the queue data structure, assigning DMA addresses, programming ATPT entries and setting a bit stating that the ATPT entries are cacheable, and returning the untranslated PCIe memory address to the device driver 1110.

After initializing the queue data structure, the device driver creates a WQE 1122 which contains a pointer, i.e. address, to a buffer 1124 that the PCIe endpoint is to use to process the WQE. For a receive work queue, buffer 1124 is used to store data from inbound data packets. For a send work queue, buffer 1124 is used to pass data to be used for outbound data packets. The address for the buffer is an untranslated PCIe address.

The device driver 1110 then writes a doorbell value to a doorbell storage device 1192, e.g., a register, in the PCIe endpoint 1190. The doorbell value indicates to the PCIe endpoint 1190 that a WQE 1122 is available. The PCIe endpoint 1190, in response to the setting of the doorbell value in the doorbell storage device 1192, fetches the WQE 1122, and thus the buffer address, from the work queue data structure 1120. Note, the doorbell value may be used to designate the number of WQEs the device driver has posted to the device.

Having fetched the untranslated PCIe address for the buffer 1124, the PCIe endpoint 1190 issues a request to the root complex 1150 for address translation of the untranslated PCIe address for the buffer 1124. The root complex 1150 uses the ATPT 1160 to translate the untranslated PCIe address into a translated system memory address and returns the translated system memory address to the PCIe endpoint 1190. The PCIe endpoint 1190 stores the translated system memory address in a local copy of the WQE 1194 in the PCIe endpoint 1190.

It should be appreciated that the translation and storing of the translated address, i.e. the system memory or real memory address, in a local copy of the WQE 1194 may be performed prior to receiving data packets from an external network attached device (not shown) for the WQE 1194. Thus, by the time that the data packet(s) are sent by the external network attached device and received in the PCIe endpoint 1190, the translated PCIe address may be stored in the local copy of the WQE 1194.

Once a result data packet is received in the PCIe endpoint 1190, the PCIe endpoint 1190 issues a DMA operation request to place the data in the buffer 1124 using the locally stored cached translated address, i.e. the system memory address corresponding to the untranslated PCIe address of the buffer 1124 stored in the local copy of the WQE 1194. The DMA operation request is performed with a bit set in the header of the DMA operation request to indicate that the address utilized in the DMA operation request is a translated system memory address. As a result, the root complex 1150 passes the DMA operation request through without address translation using the ATPT 1160 such that the data is written directly into the buffer 1124.

Once all of the data that is to be written to the buffer 1124 has been DMA'd to the buffer 1124 in this manner, the PCIe endpoint 1190 may DMA a completion queue entry (CQE) 1132 to a completion queue data structure 1130 in a similar manner. Once the device driver 1110 receives and processes the CQE 1132, the device driver may 1110 invoke the device driver services 1140 to unpin the host memory for the data buffer 1124. Upon being invoked to unpin the host memory for the data buffer 1124, the device driver services 1140 releases the DMA address for the data buffer 1124 and clears the ATPT entries for the data buffer 1124. The root complex 1150 issues an ATC entry invalidation request to the PCIe endpoint 1190 for clearing the address information in the local copy of the WQE 1194. The PCIe endpoint 1190 returns an ATC entry invalidation completion response to the root complex 1150 which informs the device driver services 1140 of the completion. The device driver services 1140 then returns control to the device driver 1110 and the operation is complete until the need to create the next WQE. It is also possible to reuse a data buffer for multiple operations (e.g., multiple WQEs), in which case the device driver services 1140 would not be called (e.g., to invalidate the data buffer address and unpin the memory), until the data buffer is no longer needed for other operations.

Figure 12:
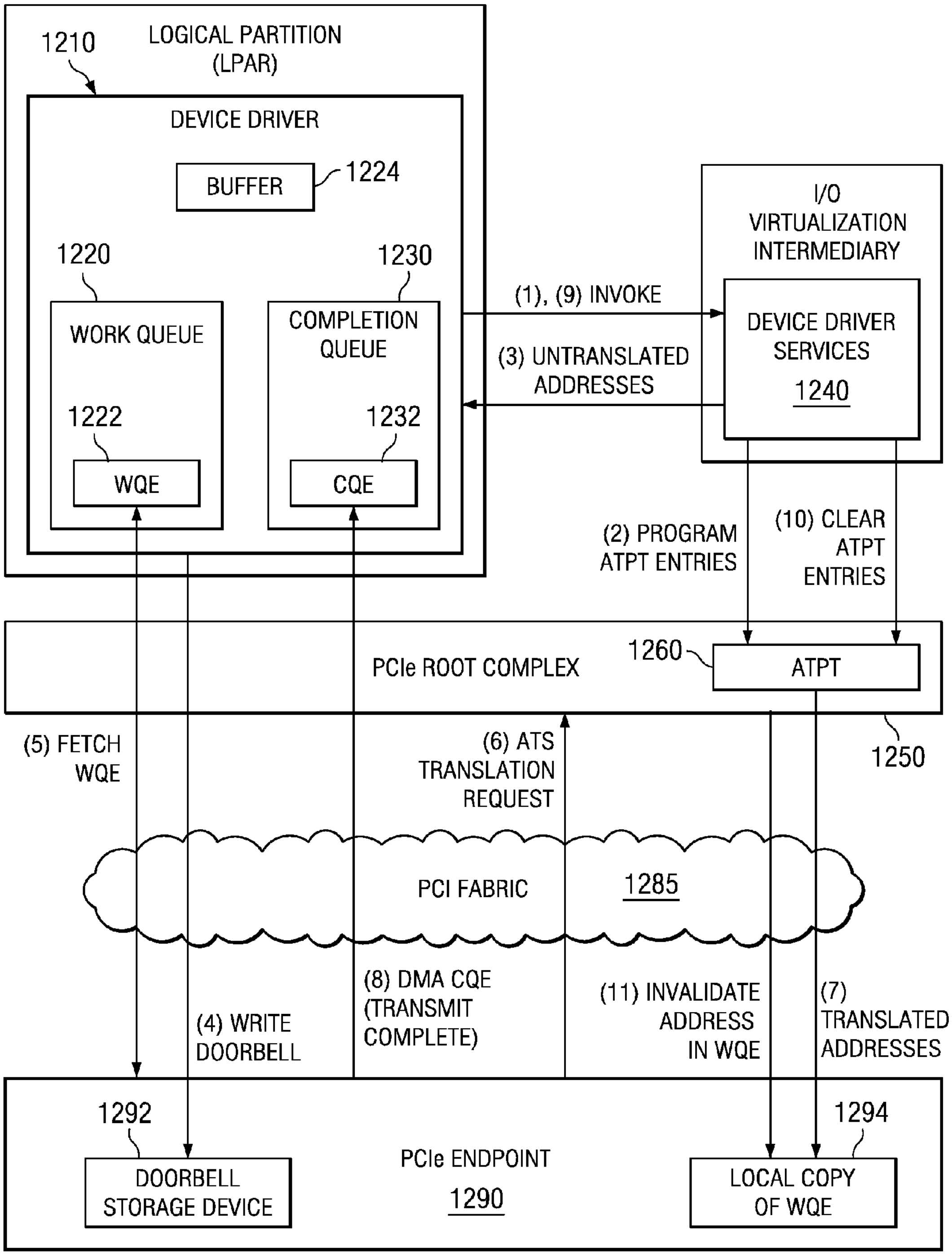
FIG. 12 is an exemplary diagram illustrating an operation for transmitting data via a PCIe endpoint using a WQE.

FIG. 12 is an exemplary diagram illustrating an operation for transmitting data via a PCIe endpoint using a WQE. When data is to be transmitted from the system image in the host system via the PCIe endpoint 1290, the device driver 1210 invokes the device driver services 1240 to pin host memory for buffer 1224, assigns DMA addresses for the buffer 1224, programs the ATPT entries in the ATPT 1260 for the buffer 1224 and sets a bit in the ATPT entries indicating that the address translation in these entries is cacheable. The device driver services 1240 return an untranslated PCIe address for the buffer 1224 to the device driver 1210.

The device driver creates a WQE 1222 which contains a pointer, i.e. address, to the buffer 1224 from which the PCIe endpoint 1290 is to transmit data via one or more of its ports. The address for the buffer 1224 is an untranslated PCIe address.

The device driver 1210 then writes a doorbell value to a doorbell storage device 1292, e.g., a register, in the PCIe endpoint 1290. The doorbell value indicates to the PCIe endpoint 1290 that a WQE 1222 is available. The PCIe endpoint 1290, in response to the setting of the doorbell value in the doorbell storage device 1292, fetches the WQE 1222, and thus the buffer address, from the work queue data structure 1220.

If the data buffers in the PCIe endpoint 1290 are full, e.g., downstream port is saturated, then the PCIe endpoint 1290 issues a ATS translation request to the root complex 1250. When the PCIe endpoint 1290 receives the translated address as a result of this ATS translation request, it stores the translated address in a local copy of the WQE 1294. After the PCIe endpoint 1290 DMA's the transmit data from the data buffer 1224 (e.g., when the port becomes available to transmit the data) and transmits the data, the PCIe endpoint 1290 then DMA's a CQE 1232 to the completion queue 1230 to indicate that the transmit operation has completed and, if requested, may also generate an interrupt.

Once the device driver 1210 retrieves the CQE 1232, the device driver 1210 invokes the device driver services 1240 to unpin the host memory for the buffer 1224, releases the DMA addresses, and clears the ATPT entries for the untranslated addresses of the buffer 1224. The root complex 1250 then issues an ATC entry invalidation request to the PCIe endpoint 1290 and awaits a completion message from the PCIe endpoint 1290. Once the ATC entry invalidation operation is performed by the PCIe endpoint 1290, the device driver services 1240 return control to the device driver 1210. It is also possible to reuse a data buffer for multiple operations (e.g., multiple WQEs), in which case the device driver services 1140 would not be called (e.g., to invalidate the data buffer address and unpin the memory), until the data buffer is no longer needed for other operations.

Figure 13A:
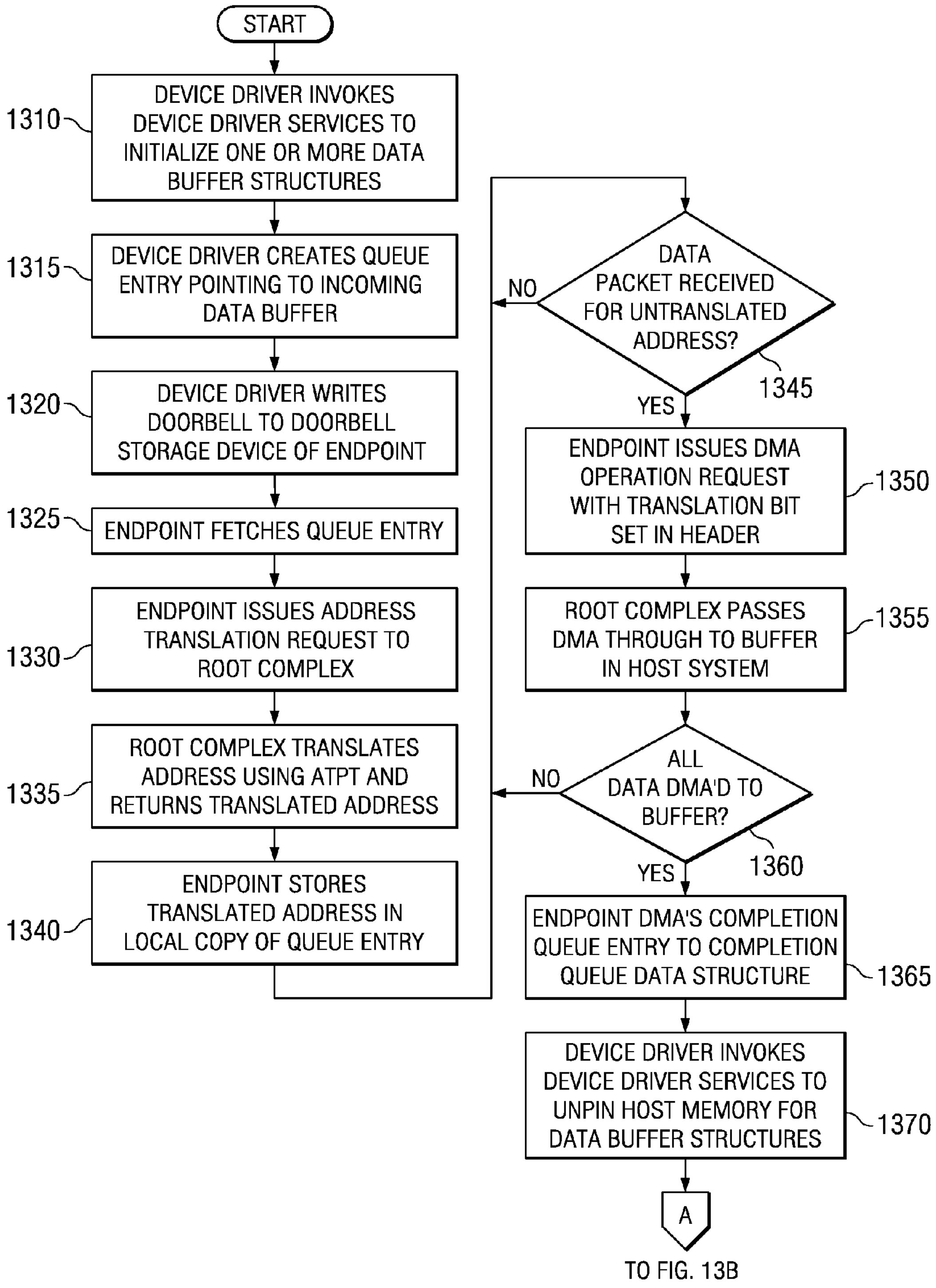
FIGS. 13A-13B depict a flowchart outlining an exemplary operation for a receive operation of a network adapter in accordance with one illustrative embodiment.
Figure 13B:
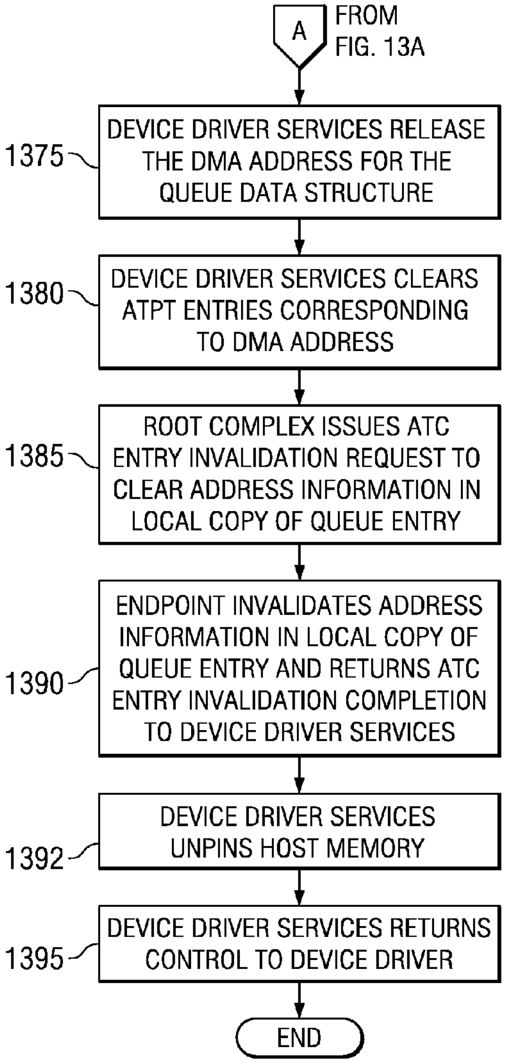

FIGS. 13A-13B depict a flowchart outlining an exemplary operation for a receive operation of a network adapter in accordance with one illustrative embodiment. As shown in FIGS. 13A-13B, the operation starts with the device driver invoking the device driver services to initialize one or more data buffer structures (step 1310). More specifically, the device driver calls the device driver services to pin the host memory associated with the buffer(s) and to setup the ATPT for the buffer addresses. After initializing the data buffer structure(s), the device driver creates a queue entry which contains a pointer, i.e. untranslated PCIe memory address, to a buffer that the PCIe endpoint is to use to store data from incoming data packets (step 1315). The device driver then writes a doorbell value to a doorbell storage device in the PCIe endpoint (step 1320).

The PCIe endpoint, in response to the setting of the doorbell value in the doorbell storage device, fetches the queue entry, and thus the untranslated PCIe buffer memory address, from the queue data structure (step 1325). Having fetched the untranslated PCIe memory address for the buffer, the PCIe endpoint issues a request to the root complex for address translation of the untranslated PCIe address for the buffer (step 1330). The root complex uses the ATPT to translate the untranslated PCIe address into a translated system memory address and returns the translated system memory address to the PCIe endpoint (step 1335). The PCIe endpoint stores the translated system memory address in a local copy of the queue entry in the PCIe endpoint (step 1340).

The PCIe endpoint determines if a data packet is received (step 1345). If not, the operation waits for a data packet to be received by returning to step 1345. If a data packet is received in the PCIe endpoint, the PCIe endpoint issues a DMA operation request, with a translation bit in the header of the DMA operation request set, to place the data in the buffer of the host system using the locally stored cached system memory address (step 1350). The root complex passes the DMA operation request through without address translation using the ATPT such that the data is written directly into the buffer (step 1355). A determination is made as to whether all of the data that is to be written to the buffer has been DMA'd to the buffer (step 1360). If not, the operation returns to step 1345.

Once all of the data that is to be written to the buffer has been DMA'd to the buffer, the PCIe endpoint DMA's a completion queue entry to a completion queue data structure (step 1365). In response to receiving the CQE, the device driver invokes the device driver services to unpin the host memory for the data buffer structures (step 1370). The device driver services release the DMA address, i.e. the untranslated PCIe memory address, for the queue data structure (step 1375) and clears the ATPT entries for the queue data structure (step 1380). The root complex issues an ATC entry invalidation request to the PCIe endpoint for clearing the address information in the local copy of the queue entry (step 1385). The PCIe endpoint then invalidates the address information in the local copy of the queue entry and returns an ATC entry invalidation completion response to the root complex which informs the device driver services of the completion (step 1390). The device driver services then unpins the host memory associated with the data buffers (step 1392). The device driver services then returns control to the device driver (step 1395) and the operation terminates.

Figure 14A:
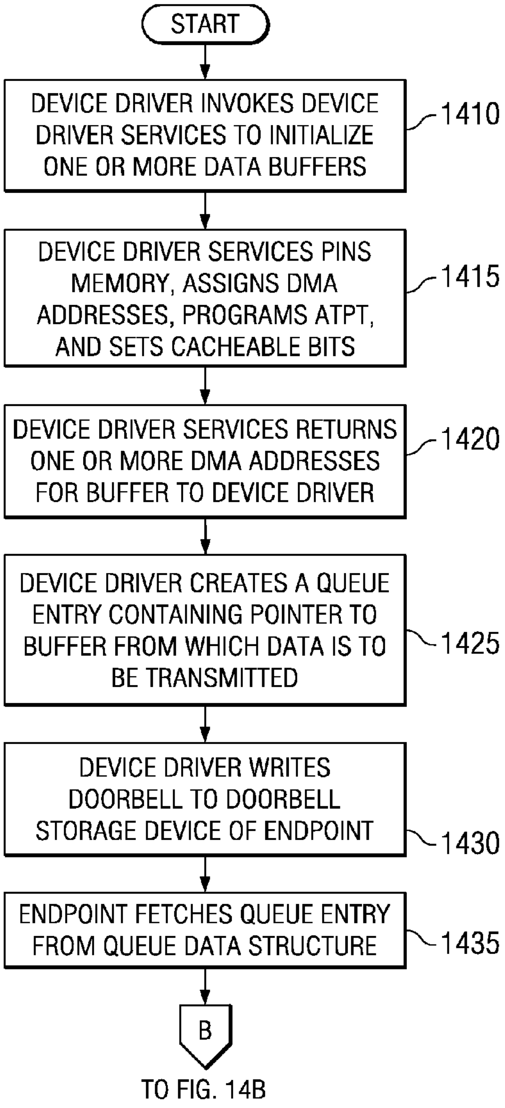
FIGS. 14A-14B depict a flowchart outlining an exemplary operation for a transmit operation of a network adapter in accordance with one illustrative embodiment.
Figure 14B:
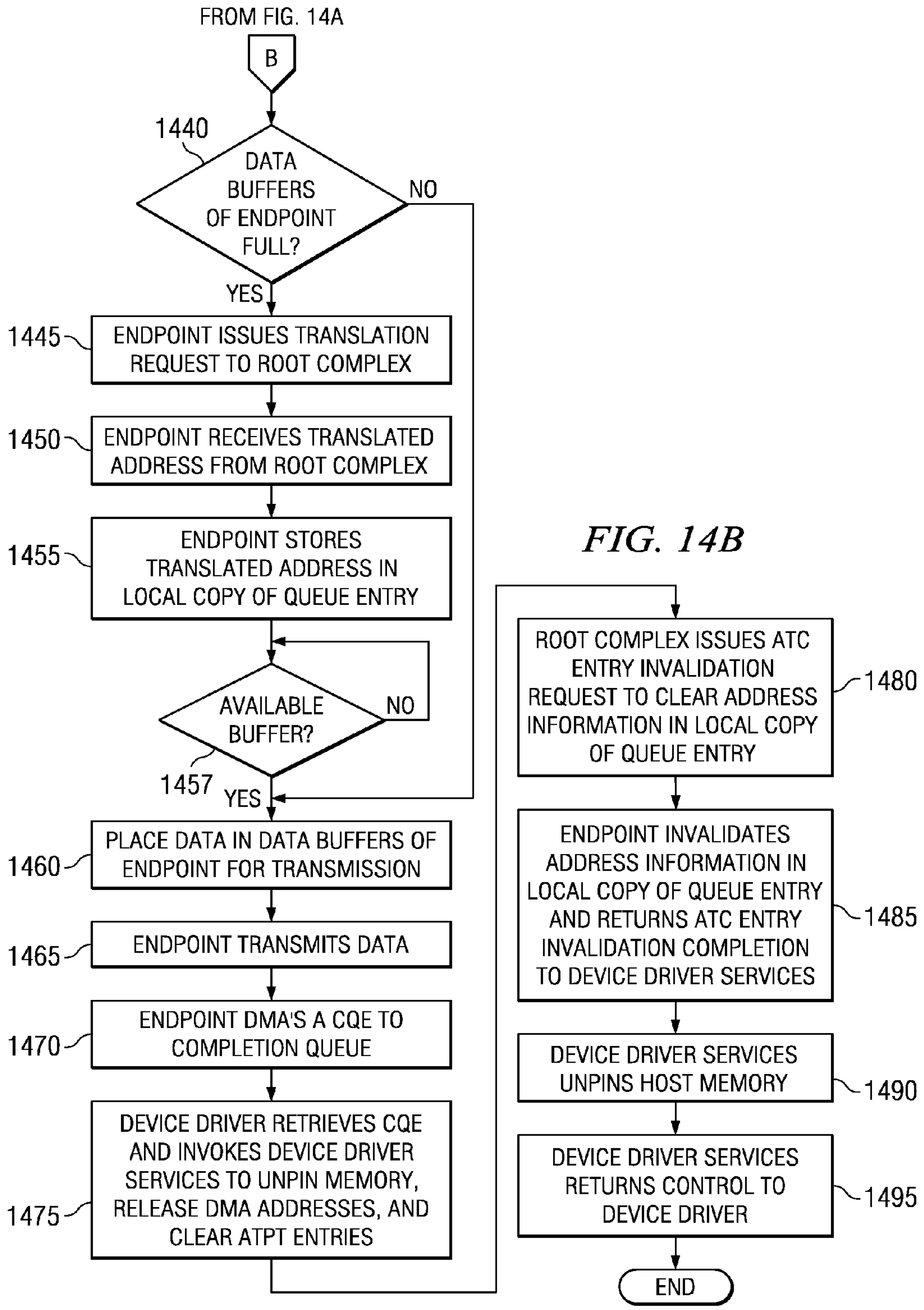

FIGS. 14A-14B depict a flowchart outlining an exemplary operation for a transmit operation of a network adapter in accordance with one illustrative embodiment. As shown in FIGS. 14A-14B, the operation starts with the device driver invoking the device driver services (step 1410) which in turn pins host memory for a buffer, assign DMA addresses for the buffer, programs the ATPT entries in the ATPT for the buffer, and sets a bit in the ATPT entries indicating that the address translation in these entries is cacheable (step 1415). The device driver services then return one or more untranslated PCIe memory address(es), i.e. DMA addresses, for the buffer to the device driver (step 1420).

The device driver creates a queue entry which contains a pointer, i.e. an untranslated PCIe memory address, to the buffer from which the PCIe endpoint is to transmit data via one or more of its ports (step 1425). The device driver then writes a doorbell value to a doorbell storage device in the PCIe endpoint (step 1430). The PCIe endpoint, in response to the setting of the doorbell value in the doorbell storage device, fetches the queue entry, and thus the untranslated PCIe memory address of the buffer, from the queue data structure (step 1435).

A determination is made as to whether data buffers in the PCIe endpoint are full (step 1440). If the data buffers are not full, the data is transferred via DMA and is placed in the data buffers of the PCIe endpoint for transmission (step 1460) and the PCIe endpoint transmits the data accordingly (step 1465).

If the data buffers are full, then the PCIe endpoint issues an ATS translation request to the root complex (step 1445). When the PCIe endpoint receives the translated address as a result of this ATS translation request (step 1450), the PCIe endpoint stores the translated address in a local copy of the queue entry (step 1455). The endpoint waits for available buffers (step 1457), the data is transferred via DMA and is placed in the data buffers of the PCIe endpoint for transmission (step 1460), and the PCIe endpoint then transmits the data accordingly (step 1465).

The PCIe endpoint then DMA's a completion queue entry (CQE) to the completion queue to indicate that the transmit operation has completed and, if requested, may also generate an interrupt (step 1470).

Once the device driver retrieves the CQE, the device driver invokes the device driver services to unpin the host memory for the buffer, release the DMA addresses, and clear the ATPT entries for the untranslated addresses of the buffer (step 1475). The root complex then issues an ATC entry invalidation request to the PCIe endpoint (step 1480) and awaits a completion message from the PCIe endpoint (step 1485). Once the ATC entry invalidation operation is performed by the PCIe endpoint, the device driver services unpins the host memory associated with the data buffer (step 1490) and then return control to the device driver (step 1495) and the operation terminates.

Thus, the illustrative embodiments provide a mechanism by which work queues and work queue entries may be generated for the reception and/or transmission of data via a network adapter PCIe endpoint into a buffer of the device driver in the host system. ATPT entries for the buffer may be established with the translations for the addresses corresponding to the buffer being cacheable in the PCIe endpoint for use in directly accessing the buffer without having to perform address translation in the root complex.

In addition to network adapters and SCSI adapters, the PCIe endpoint may be adapters that support registration of user space memory, such as an InfiniBand™ host channel adapter (HCA), an iWARP Remote Direct Memory Access (RDMA) enabled Network Interface Controller (RNIC), an "RDMA directly over Ethernet" adapter, or a Network Interface Controller (NIC) that supports memory registration. With adapters that support memory registration communication of work requests is performed through send and receive queue pairs (QPs) and work completions are returned through completion queues (CQs). Adapters that support memory registration provide a mechanism that allows privileged software to register the virtual address to physical address translations of a user space buffer with the adapter. These buffers may then be referenced in send and receive work requests.

The QPs use a protection domain mechanism to associate QP with a previously registered memory buffer. Chapter 10 and 11 of the InfiniBand™ (IB) architecture specifications defines the semantics for these operations over IB. Similarly, the RDMA Protocol Verbs Specification defined the semantics for these operations over iWARP. For more information about InfiniBand™, host channel adapters, memory registration, and queue pairs, reference is made to the InfiniBand™ specification available to InfiniBand™ Trade Association Members at http://www.infinibandta.org/home/. For more information about iWARP, RNICs, memory registration, and queue pairs, reference is made to the RDMA Protocol Verbs Specification at http://www.rdmaconsortium.org/home/draft-hilland-iwarp-verbs-v1.0-RDMAC.pdf.

In further illustrative embodiments in which the endpoints are adapters that support registration of user space memory, such user space memory registration is performed so as to store address translation entries in the PCIe endpoints. That is, the mechanisms of these further illustrative embodiments, in addition to programming the ATPT entries in the root complex, further program Memory Registration (MR) ATPT entries in the PCIe endpoint for use in performing communications between the host system and PCIe adapters that support memory registration.

Figure 15:
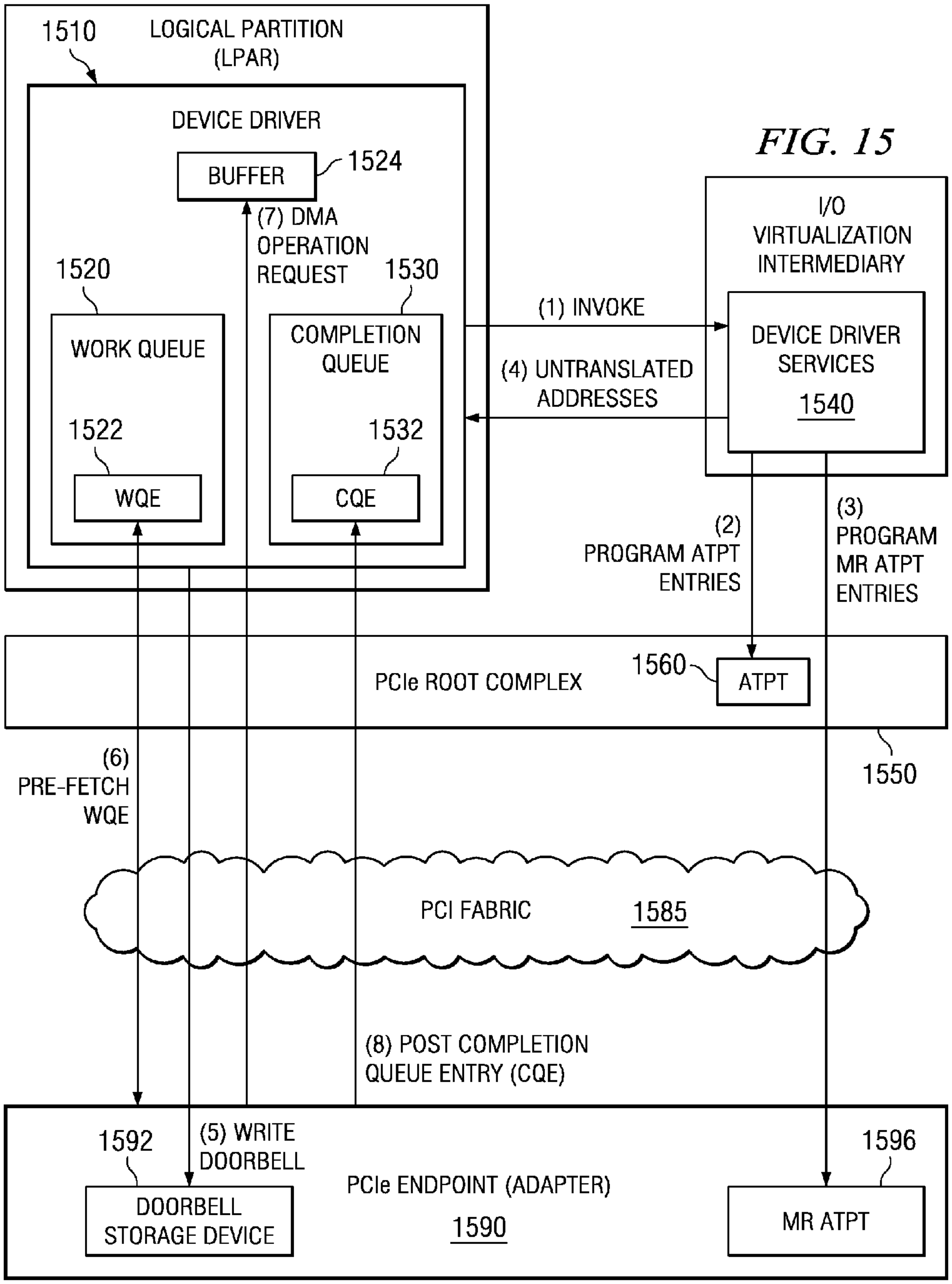
FIG. 15 is an exemplary diagram illustrating an operation for using a Verb ATPT to perform DMAs with a host system in accordance with one illustrative embodiment.

FIG. 15 is an exemplary diagram illustrating an operation for using a Memory Registration (MR) ATPT to perform DMAs with a host system in accordance with one illustrative embodiment. As shown in FIG. 15, the mechanisms of this illustrative embodiment support using real memory addresses in the MR ATPT to thereby avoid the host ATPT when a previously registered memory region or memory window is referenced by a work request or an incoming operation, such as an RDMA Write, RDMA Read, or Atomic.

The mechanism illustrated in FIG. 15 begins when a memory region registration or re-registration is invoked by a user space or kernel program through the device driver. The device driver 1510 invokes the device driver services 1540 to pin the host memory and register the pinned memory with the PCIe endpoint 1590. The device driver 1510 passes to the device driver services 1540 the physical memory address and any registration modifiers, as defined by the adapter's memory registration or re-registration standard, such as InfiniBand™ Verbs Specification or RDMA Protocol Verbs Specification, or proprietary interface.

The device driver services 1540 pins the corresponding host memory for the device driver's data buffer 1524 and programs the host ATPT 1560 to enable ATPT bypass for the PCIe endpoint (adapter), for example by allowing the adapter's PCIe Requestor Identifier to perform translated PCIe Direct Memory Access operations. The Requestor Identified is unique with regard to the PCIe Bus Number, Device Number and Function Number space.

In addition, the device driver services 1540 programs the Memory Registration (MR) ATPT entries in the MR ATPT 1596 of the PCIe endpoint (adapter) 1590 and sets the ATC enable bit, i.e. cacheable bit, in the ATPT and MR ATPT entries of the ATPT 1560 and MR ATPT 1596. The device driver services 1540 returns the untranslated PCIe address and registration modifiers to the device driver 1510.

As described above part of the device driver service's programming of the MR ATPT entries consists of registering the pinned memory region with the PCIe endpoint 1590 by creating an entry in the PCIe endpoint's MR ATPT 1596. A lower portion of the MR ATPT 1596, i.e. the page table, is filled with the translated addresses, which are the real memory addresses, for the data buffer 1524 and the PCIe endpoint 1590 is informed that these are translated addresses in an implementation dependent manner.

The device driver 1510 may then create a work queue entry (WQE) 1522 in a Work Queue(WQ) 1520 of the device driver 1510 and may write a doorbell value to the doorbell storage location 1592. In response to the doorbell value being set in the doorbell storage location 1592, the PCIe endpoint 1590 uses the translated addresses for the Work Queue 1520 to DMA one or more WQEs 1522 to the PCIe endpoint.

For Send WQEs, that is, for an outbound Send message, the PCIe endpoint 1590 uses each Send WQE's data segment to reference an entry in the MR ATPT 1596. If the access control checks pass, the PCIe endpoint then uses the translated addresses from the MR ATPT 1596 to perform DMAs from the host system's data buffer 1524. The PCIe endpoint 1590 sends the set of data segments associated with the Send WQE as a message on its downstream link. When the DMAs are complete, the PCIe endpoint 1590 uses the translated addresses for the Completion Queue (CQ) 1530 to DMA a Completion Queue Entry (WQE) 1532 to the host's Completion Queue 1530. If requested, the PCIe endpoint 1590 also generates an interrupt.

For outbound RDMA Write WQEs, that is, for an outbound RDMA Write message, the PCIe endpoint 1590 uses each RDMA Write WQE's data segment to reference an entry in the MR ATPT 1596. If the access control checks pass, the PCIe endpoint 1590 then uses the translated addresses from the MR ATPT 1596 to perform DMAs from the host system's data buffer 1524. The PCIe endpoint transmits the set of data segments associated with the RDMA Write WQE as a message on its downstream link. When the DMAs are complete, the PCIe endpoint 1590 uses the translated addresses for the Completion Queue (CQ) 1530 to DMA a Completion Queue Entry (WQE) 1532 to the host's Completion Queue 1530. If requested, the PCIe endpoint 1590 also generates an interrupt.

For Outbound RDMA Read WQEs, that is, for an outbound RDMA Read message, the PCIe endpoint 1590 transmits the RDMA Read message on its downstream link. When the remote location returns the RDMA Read Response, the PCIe endpoint 1590 uses the incoming RDMA Read Response header's RDMA fields to reference an entry in the MR ATPT 1596, where for iWARP, the RDMA fields include a Steering Tag, Tagged Offset and Length. For InfiniBand™ the RDMA Read Response does not contain a header and the PCIe endpoint 1590 uses an internal queue pair context to obtain the RDMA fields used to reference an entry in the MR ATPT 1596. If the access control checks pass, the PCIe endpoint 1590 then uses the translated addresses from the MR ATPT 1596 to perform DMAs to the host system's data buffer 1524.

For Outbound Atomic WQEs, that is, for an outbound Atomic message, the PCIe endpoint 1590 transmits the Atomic message on its downstream link. When the remote location returns the Atomic Response, the PCIe endpoint 1590 uses the incoming Atomic Response header's RDMA fields to reference an entry in the MR ATPT 1596. For InfiniBand™, the Atomic Response does not contain a header and the PCIe endpoint 1590 uses an internal queue pair context to obtain the RDMA fields used to reference an entry in the MR ATPT 1596. If the access control checks pass, the PCIe endpoint 1590 then uses the translated addresses from the MR ATPT 1596 to perform DMAs to the host system's data buffer 1524.

For inbound Send WQEs, that is, for an incoming Send message, the PCIe endpoint 1590 uses the data segments of the WQE associated with the incoming Send to reference one or more entries in the MR ATPT 1596. If the access control checks pass, the PCIe endpoint 1590 then uses the translated addresses from the MR ATPT 1596 to perform DMAs to the host system's data buffer 1524. When the DMAs are complete, the PCIe endpoint 1590 uses the translated addresses for the Completion Queue 1530 to DMA a WQE 1532 to the host's Completion Queue 1530. If requested, the PCIe endpoint 1590 also generates an interrupt.

For inbound RDMA Writes, that is, for an incoming RDMA Write message, the PCIe endpoint 1590 uses the incoming RDMA Write header's RDMA fields to reference an entry in the MR ATPT 1596, where for iWARP, the RDMA fields include a Steering Tag, Tagged Offset, and Length, and for InfiniBand™ the RDMA fields include a R_Key, Virtual Address, and Length. If the access control checks pass, the PCIe endpoint 1590 then uses the translated addresses from the MR ATPT 1596 to perform DMAs to the host system's data buffer 1524. When the DMAs are complete, if the RDMA Write requires a completion event, the PCIe endpoint 1590 uses the translated addresses for the Completion Queue 1530 to DMA a WQE 1532 to the host's Completion Queue 1530. If requested, the PCIe endpoint 1590 also generates an interrupt.

For inbound RDMA Reads and Atomics, that is, for an incoming RDMA Read or Atomic message, the PCIe endpoint 1590 uses the incoming RDMA Read or Atomic header's RDMA fields to reference an entry in the MR ATPT 1596, where for iWARP, the RDMA fields include the Steering Tag, Tagged Offset, and Length, and for InfiniBand™ the RDMA fields include the R_Key, Virtual Address, and Length. If the access control checks pass, the PCIe endpoint 1590 then performs the Atomic operation, which includes using the translated addresses from the MR ATPT 1596 to perform DMAs from the host system's data buffer 1524. When the DMAs are complete, the PCIe endpoint 1590 transmits the data associated with the RDMA Read or Atomic as a message on its downstream link.

When the device driver 1510 no longer needs the data buffer 1524, the device driver 1510 invokes the device driver services 1540 to free the memory. The device driver services 1540 invalidates the ATPT entries in the ATPT 1560, deregisters the memory by invalidating the MR ATPT 1596, unpins the host memory, and releases the DMA addresses.

The above description assumes that the device driver services 1540 programs the MR ATPT entries, however the illustrative embodiments are not limited to such. Rather, in an alternative embodiment, the device driver services 1540 may program only the ATPT entries in the ATPT 1560 of the root complex 1550. When the PCIe endpoint 1590 receives a memory registration or re-registration request, it may issue one or more Translation Requests to the PCIe Root Complex 1550 to obtain the translated, i.e. real, memory addresses associated with the memory region being registered or re-registered. For each Translation Request, the PCIe Root Complex 1550 returns the associated translated or real memory addresses. The PCIe endpoint stores these translated addresses into the MR ATPT 1596 and uses them similar to the previously described illustrative embodiments.

For the invalidation of the MR ATPT 1596, when a memory region is deregistered, either the device driver services 1540 issues an Invalidation Request to the PCIe endpoint 1590 or the device driver services 1540 requests the PCIe Root Complex 1550 to issue an Invalidation Request to the PCIe endpoint 1590. Upon receiving an Invalidation Request the PCIe endpoint 1590 searches a translation usage table (not shown) to determine which MR ATPT 1596 entries are marked as using the translated addresses which are being invalidated. If the Invalidation Request is performed after all the memory regions that were using the translated address have been deregistered, then no MR ATPT entries will be found for the Invalidation Request and the PCIe endpoint 1590 will return a successful result for the Invalidation Request. If memory regions that use the translated address are still in use, then the Invalidate Request is never completed and the device driver services 1540 experience an Invalidate Request timeout which triggers an error recovery procedure, such as resetting the PCIe endpoint 1590.

Figure 16B:
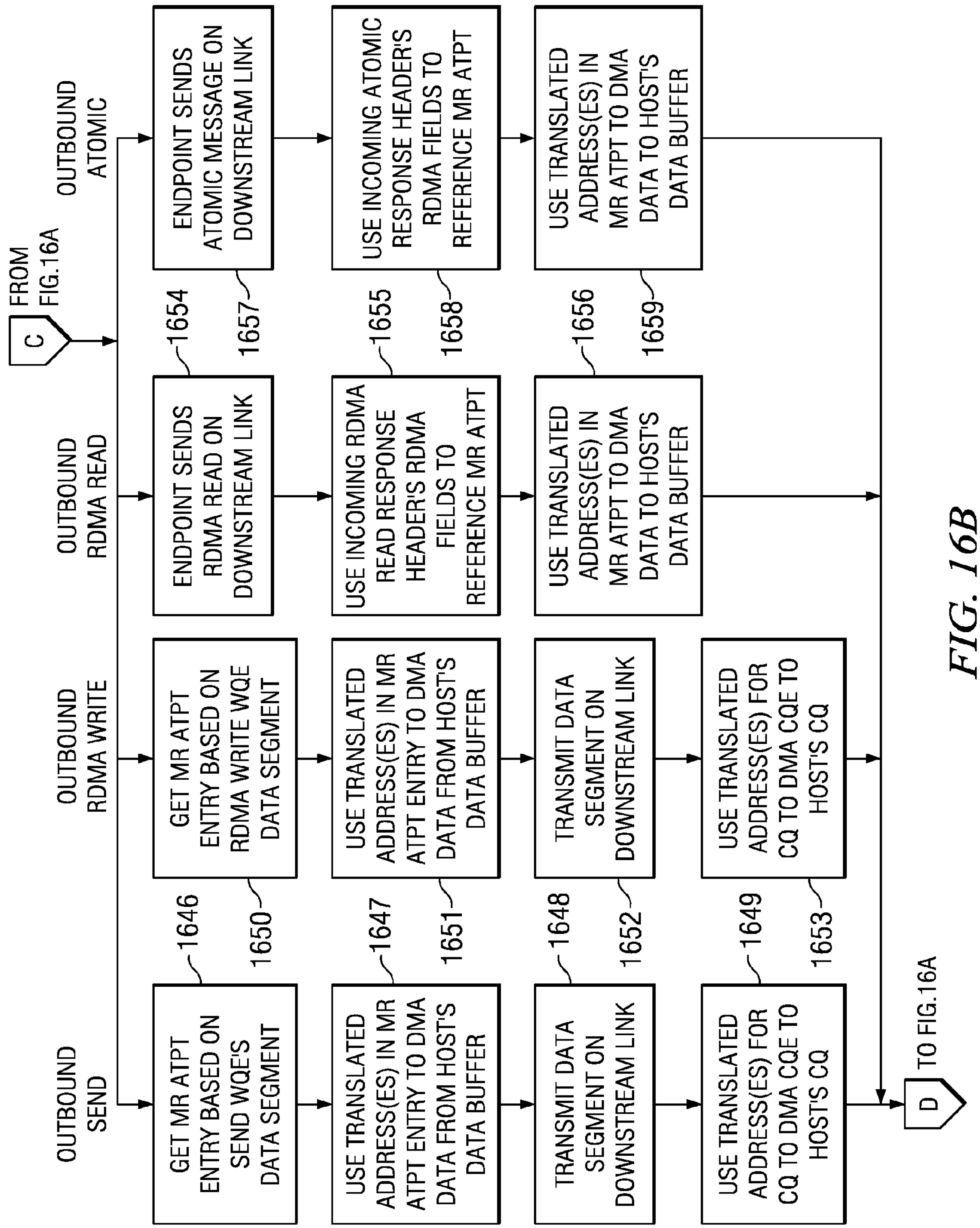
Figure 16C:
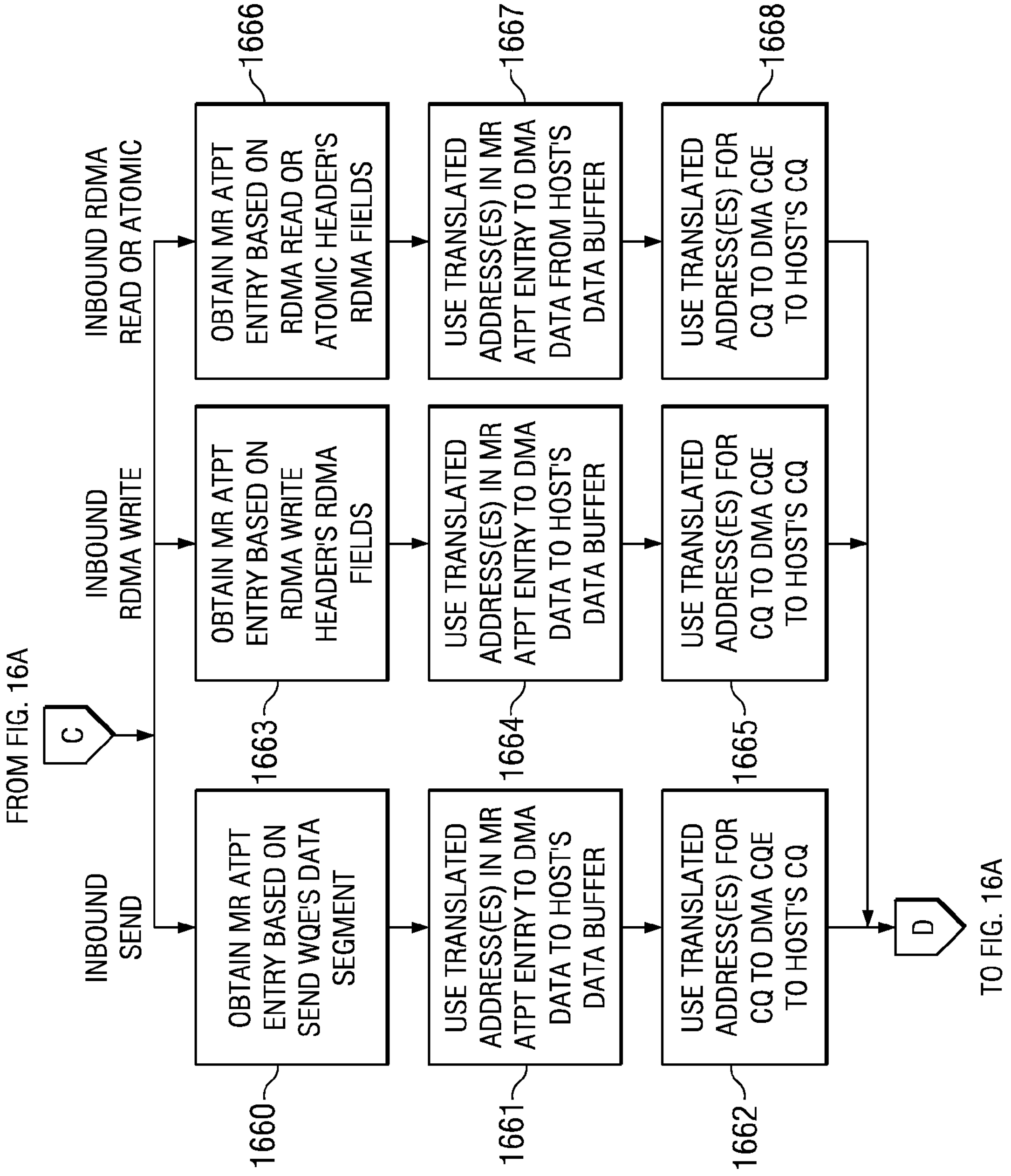

FIGS. 16A-16C depict a flowchart outlining an exemplary operation for registering memory with a PCIe endpoint in accordance with one illustrative embodiment. As shown in FIGS. 16A-16C, the operation starts with the device driver invoking the device driver services to pin the host memory and register the pinned memory with the PCIe endpoint (step 1610). The device driver passes to the device driver services the memory address and any registration modifiers (step 1615).

The device driver services pin the corresponding host memory for the device driver's data buffer and program the host ATPT (step 1620) to enable ATPT bypass for the adapter, for example by allowing the adapter's PCIe Requestor Identifier to perform translated PCIe Direct Memory Access operations. In addition, the device driver services program the MR ATPT entries in the MR ATPT of the PCIe endpoint and sets the ATC enable bit in the ATPT and MR ATPT entries (step 1625). The device driver services return registration output modifiers to the device driver (step 1630).

The device driver then creates a work queue entry in a work queue of the device driver and writes a doorbell value to the doorbell storage location (step 1635). In response to the doorbell value being set in the doorbell storage device, the PCIe endpoint fetches one or more WQEs (step 1640).

The PCIe endpoint then selects the functions to be performed based on the operation type specified in the WQE (step 1645): Send, Outbound RDMA Write, Outbound RDMA Read, Outbound Atomic, Receive (a.k.a. Inbound Send), Inbound RDMA Write, and Inbound RDMA Read and Atomic.

For Send WQEs, that is, for an outbound Send message, the PCIe endpoint uses the Send WQE's data segment to reference an entry in the MR ATPT (1646). If the access control checks pass, which is assumed to be the case in the flow of FIGS. 16A-16C, the PCIe endpoint then uses the translated addresses from the MR ATPT to perform DMAs of data from the host system's data buffer (step 1647). The PCIe endpoint sends the set of data segments associated with the Send WQE as a message on its downstream link (step 1648). When the DMAs are complete, the PCIe endpoint uses the translated addresses for the Completion Queue to DMA a WQE to the host's Completion Queue (step 1649). If requested, the PCIe endpoint also generates an interrupt.

For outbound RDMA Write WQES, that is, for an outbound RDMA Write message, the PCIe endpoint uses each RDMA Write WQE's data segment to reference an entry in the MR ATPT (step 1650). If the access control checks pass, which is assumed to be the case in the flow of FIGS. 16A-16C, the PCIe endpoint then uses the translated addresses from the MR ATPT to perform DMAs from the host system's data buffer (step 1651). The PCIe endpoint transmits the set of data segments associated with the RDMA Write WQE as a message on its downstream link (step 1652). When the DMAs are complete, the PCIe endpoint uses the translated addresses for the Completion Queue to DMA a WQE to the host's Completion Queue (step 1653). If requested, the PCIe endpoint also generates an interrupt.

For Outbound RDMA Read WQEs, that is, for an outbound RDMA Read message, the PCIe endpoint transmits the RDMA Read message on its downstream link (step 1654). When the remote location returns the RDMA Read Response, the PCIe endpoint uses the incoming RDMA Read Response header's RDMA fields to reference an entry in the MR ATPT (step 1655). If the access control checks pass, which is assumed to be the case in the flow of FIGS. 16A-16C, the PCIe endpoint then uses the translated addresses from the MR ATPT to perform DMAs to the host system's data buffer (step 1656).

For Outbound Atomic WQEs, that is, for an outbound Atomic message, the PCIe endpoint transmits the Atomic message on its downstream link (step 1657). When the remote location returns the Atomic Response, the PCIe endpoint uses the incoming Atomic Response header's RDMA fields to reference an entry in the MR ATPT (step 1658). If the access control checks pass, which is assumed to be the case in the flow of FIGS. 16A-16C, the PCIe endpoint then uses the translated addresses from the MR ATPT to perform DMAs to the host system's data buffer (step 1659).

For inbound Send WQEs, that is, for an incoming Send message, the PCIe endpoint uses the data segments of the WQE associated with the incoming Send to reference one or more entries in the MR ATPT (step 1660). If the access control checks pass, which is assumed to be the case in the flow of FIGS. 16A-16C, the PCIe endpoint then uses the translated addresses from the MR ATPT to perform DMAs to the host system's data buffer (step 1661). When the DMAs are complete, the PCIe endpoint uses the translated addresses for the Completion Queue to DMA a WQE to the host's Completion Queue (step 1662). If requested, the PCIe endpoint also generates an interrupt.

For inbound RDMA Writes, that is, for an incoming RDMA Write message, the PCIe endpoint uses the incoming RDMA Write header's RDMA fields to reference an entry in the MR ATPT (step 1663). If the access control checks pass, which is assumed to be the case in the flow of FIGS. 16A-16C, the PCIe endpoint then uses the translated addresses from the MR ATPT to perform DMAs to the host system's data buffer (step 1664). When the DMAs are complete, if the RDMA Write requires a completion event, the PCIe endpoint uses the translated addresses for the Completion Queue to DMA a WQE to the host's Completion Queue (step 1665). If requested, the PCIe endpoint also generates an interrupt.

For inbound RDMA Reads and Atomics, that is, for an incoming RDMA Read or Atomic message, the PCIe endpoint uses the incoming RDMA Read or Atomic header's RDMA fields to reference an entry in the MR ATPT (step 1666). If the access control checks pass, which is assumed to be the case in the flow of FIGS. 16A-16C, the PCIe endpoint then performs the inbound RDMA Read or Atomic operation, which includes using the translated addresses from the MR ATPT to perform DMAs from the host system's data buffer (step 1667). When the DMAs are complete, the PCIe endpoint transmits the data associated with the RDMA Read or Atomic as a message on its downstream link (step 1668).

When the device driver no longer needs the data buffer (step 1670), the device driver invokes the device driver services to free memory (step 1675). The device driver services invalidates the ATPT entries in both the ATPT, de-registers the memory by invalidating the MR ATPT and releases the DMA addresses (step 1680). The device driver services may then return control to the device driver (step 1685) and the operation terminates.

Thus, the illustrative embodiments provide mechanisms for communication with different types of PCIe endpoints, including network adapters, SCSI adapters, InfiniBand™ adapters, and the like, in such a manner as to distribute the responsibilities of this communication across a device driver and device driver services. The illustrative embodiments facilitate the use of caching of translated addresses in these various types of PCIe endpoints in different ways depending upon the type of PCIe endpoint utilized. The caching of these translated addresses permits the PCIe endpoint to directly access queues, buffers, and system memory of the host system without having to go through an address translation operation in the root complex of the host system.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for managing address translations, comprising:

invoking, by a device driver, device driver services for initializing address translation entries in an address translation data structure of a root complex of the data processing system;

passing, from the device driver to the device driver services, an address of a device driver memory data structure and registration modifiers;

creating, by the device driver services, one or more address translation data structure entries in the address translation data structure associated with the root complex, the one or more address translation data structure entries specifying a translation of an untranslated address into a translated address that is used to directly access the device driver memory data structure;

creating, by the device driver services, one or more memory registration (MR) address translation and protection table (ATPT) entries, corresponding to the one or more address translation data structure entries, in a MR ATPT data structure of an adapter; and using the MR ATPT data structure with I/O operations to bypass the address translation data structure associated with the root complex, wherein the device driver is provided in one of a system image or an untrusted logical partition of the data processing system and the device driver services are provided in a trusted virtualization intermediary.

2. The method of claim 1, wherein creating one or more MR ATPT entries comprises:

registering, with the adapter, a pinned memory region associated with the device driver memory data structure;

populating a portion of the MR ATPT data structure entry with one or more addresses for the device driver memory data structure; and informing the adapter that the one or more addresses in the lower portion of the MR ATPT data structure are translated addresses that can be used in Direct Memory Access (DMA) transactions to bypass the address translation data structure associated with the root complex.

3. The method of claim 1, further comprising:

invoking, by the device driver, the device driver services for invalidating an address translation data structure entry in the address translation data structure of the root complex of the data processing system; and invalidating, by device driver services, the address translation data structure entry in the address translation data structure of the root complex of the data processing system and one or more corresponding MR ATPT entries on the adapter.

4. The method of claim 1, wherein invalidating an MR ATPT entry comprises:

de-registering, with the adapter, the device driver memory data structure.

5. The method of claim 1, wherein creating one or more MR ATPT entries comprises:

registering, with the adapter, a previously pinned memory region associated with the device driver memory data structure;

populating a portion of the MR ATPT data structure entry with one or more addresses for the device driver memory data structure; and informing the adapter that the one or more addresses in the lower portion of the MR ATPT data structure are untranslated addresses that are to be translated before they are used in a DMA transaction that bypasses the address translation data structure associated with the root complex.

6. The method of claim 5, wherein, for a MR ATPT entry created by the device driver services, the adapter:

performs a translation request for one or more addresses associated with the MR ATPT entry; and populates the portion of the MR ATPT data structure with the one or more translated addresses corresponding to the one or more untranslated addresses associated with the MR ATPT entry.

7. The method of claim 1, wherein using the MR ATPT data structure with I/O operations to bypass the address translation data structure associated with the root complex comprises:

utilizing the one or more translated addresses in the MR ATPT data structure entry of the adapter to process a direct memory access (DMA) transaction associated with that MR ATPT data structure entry.

8. The method of claim 7, wherein the DMA transaction places data from the adapter into the device driver memory data structure using the translated address without invoking an address translation operation of the root complex during the placing of the data into the device driver memory data structure.

9. The method of claim 7, wherein the DMA transaction is associated with the processing of a Send Work Queue Entry (WQE), Remote Direct Memory Access (RDMA) Write WQE, RDMA Read WQE, Receive WQE, incoming RDMA Write or incoming RDMA Read.

10. The method of claim 1, further comprising:

returning, from the device driver services, one or more untranslated addresses associated with the device driver memory data structure to the device driver; and returning, from the device driver services, one or more registration modifiers to the device driver.

11. The method of claim 1, wherein the trusted virtualization intermediary is one of a virtualization intermediary operating system, a hypervisor, or a service partition.

12. A computer program product comprising a computer useable medium having a computer readable program, wherein the computer readable program, when executed on a computing device, causes the computing device to:

invoke, by a device driver, device driver services for initializing address translation entries in an address translation data structure of a root complex of the data processing system;

pass, from the device driver to the device driver services, an address of a device driver memory data structure and registration modifiers;

create, by the device driver services, one or more address translation data structure entries in the address translation data structure associated with the root complex, the one or more address translation data structure entries specifying a translation of an untranslated address into a translated address that is used to directly access the device driver memory data structure;

create, by the device driver services, one or more memory registration (MR) address translation and protection table (ATPT) entries, corresponding to the one or more address translation data structure entries, in a MR ATPT data structure of an adapter; and use the MR ATPT data structure with I/O operations to bypass the address translation data structure associated with the root complex, wherein the device driver is provided in one of a system image or an untrusted logical partition of the data processing system and the device driver services are provided in a trusted virtualization intermediary.

13. The computer program product of claim 12, wherein the computer readable program causes the computing device to create one or more MR ATPT entries by:

registering, with the adapter, a pinned memory region associated with the device driver memory data structure;

populating a portion of the MR ATPT data structure entry with one or more addresses for the device driver memory data structure; and informing the adapter that the one or more addresses in the lower portion of the MR ATPT data structure are translated addresses that can be used in Direct Memory Access (DMA) transactions to bypass the address translation data structure associated with the root complex.

14. The computer program product of claim 12, wherein the computer readable program further causes the computing device to:

invoke, by the device driver, the device driver services for invalidating an address translation data structure entry in the address translation data structure of the root complex of the data processing system; and invalidate, by device driver services, the address translation data structure entry in the address translation data structure of the root complex of the data processing system and one or more corresponding MR ATPT entries on the adapter.

15. The computer program product of claim 12, wherein the computer readable program causes the computing device to invalidate an MR ATPT entry by:

de-registering, with the adapter, the device driver memory data structure.

16. The computer program product of claim 12, wherein the computer readable program causes the computing device to create one or more MR ATPT entries by:

registering, with the adapter, a previously pinned memory region associated with the device driver memory data structure;

populating a portion of the MR ATPT data structure entry with one or more addresses for the device driver memory data structure; and informing the adapter that the one or more addresses in the lower portion of the MR ATPT data structure are untranslated addresses that are to be translated before they are used in a DMA transaction that bypasses the address translation data structure associated with the root complex.

17. The computer program product of claim 16, wherein the computer readable program causes the computing device, for a MR ATPT entry created by the device driver services, to:

perform a translation request for one or more addresses associated with the MR ATPT entry; and populate the portion of the MR ATPT data structure with the one or more translated addresses corresponding to the one or more untranslated addresses associated with the MR ATPT entry.

18. The computer program product of claim 12, wherein the computer readable program causes the computing device to use the MR ATPT data structure with I/O operations to bypass the address translation data structure associated with the root complex by:

utilizing the one or more translated addresses in the MR ATPT data structure entry of the adapter to process a direct memory access (DMA) transaction associated with that MR ATPT data structure entry.

19. An apparatus, comprising:

a processor; and an adapter coupled to the processor, wherein the processor:

invokes, by a device driver, device driver services for initializing address translation entries in an address translation data structure of a root complex of the data processing system;

passes, from the device driver to the device driver services, an address of a device driver memory data structure and registration modifiers;

creates, by the device driver services, one or more address translation data structure entries in the address translation data structure associated with the root complex, the one or more address translation data structure entries specifying a translation of an untranslated address into a translated address that is used to directly access the device driver memory data structure; and creates, by the device driver services, one or more memory registration (MR) address translation and protection table (AIPT) entries, corresponding to the one or more address translation data structure entries, in a MR ATPT data structure of the adapter, and wherein the adapter uses the MR ATPT data structure with I/O operations to bypass the address translation data structure associated with the root complex, and wherein the device driver is provided in one of a system image or an untrusted logical partition of the data processing system and the device driver services are provided in a trusted virtualization intermediary.

* * * * *